United States Patent
Hayakawa et al.

(10) Patent No.: US 8,238,325 B2
(45) Date of Patent: Aug. 7, 2012

(54) PACKET COMMUNICATION NETWORK AND PACKET COMMUNICATION METHOD

(75) Inventors: Kazuhiro Hayakawa, Kanagawa (JP); Satoru Yoshida, Tokyo (JP); Makoto Fukuda, Tokyo (JP); Nobuo Shigeta, Tokyo (JP); Kazuhiko Ogawa, Tokyo (JP); Shin Hashimoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 983 days.

(21) Appl. No.: 10/589,990

(22) PCT Filed: Oct. 25, 2005

(86) PCT No.: PCT/JP2005/019627
§ 371 (c)(1),
(2), (4) Date: Aug. 18, 2006

(87) PCT Pub. No.: WO2006/046576
PCT Pub. Date: May 4, 2006

(65) Prior Publication Data
US 2007/0242684 A1 Oct. 18, 2007

(30) Foreign Application Priority Data
Oct. 29, 2004 (JP) .................. 2004-316070

(51) Int. Cl.
*H04L 12/66* (2006.01)
(52) U.S. Cl. ........ 370/352; 370/401; 709/238; 709/249; 709/252; 398/43; 398/165
(58) Field of Classification Search .................. None
See application file for complete search history.

(56) References Cited

U.S. PATENT DOCUMENTS

| | | | | |
|---|---|---|---|---|
| 5,351,146 A | * | 9/1994 | Chan et al. | 398/58 |
| 6,339,488 B1 | * | 1/2002 | Beshai et al. | 398/59 |
| 6,665,495 B1 | * | 12/2003 | Miles et al. | 398/54 |
| 6,842,463 B1 | * | 1/2005 | Drwiega et al. | 370/468 |
| 6,970,451 B1 | * | 11/2005 | Greenberg et al. | 370/352 |

FOREIGN PATENT DOCUMENTS

JP 2000-201112 7/2000
(Continued)

OTHER PUBLICATIONS

[Online], Nippon Telegraph and Telephone Corporation, "Technical Reference Materials, Telephone Service Interface, Fifth Edition", Internet URL:http//www.ntt-west.co.jp/gisanshi/analog/edit5j.pdf, pp. 1-5. (with partial English Translation).
Maruyama, Ryuichiro, "Connection Environment of Internet VPN and their functions for administrators (Part 1) 1)", Internet URL:http//www.atmarkit.co.jp/fsecurity/special/38vpn/vpn02.html, pp. 1-5, Mar. 6, 2003. (with partial English Translation).

(Continued)

*Primary Examiner* — Brian Roberts
(74) *Attorney, Agent, or Firm* — Oblon, Spivak, McClelland, Maier & Neustadt, L.L.P.

(57) ABSTRACT

Full-mesh WDM transmission units, each of which includes n number of interfaces and is capable of establishing a bidirectional full-mesh communication between all of the interfaces using wavelength paths based on a wavelength division multiplexing technique, are connected in a multistage tree-shaped structure by internetwork connection units through edge-packet transfer units connected to the respective interfaces. Therefore, it is possible to hold a direct communication between user terminals connected to the edge-packet transfer units of the same full-mesh WDM transmission unit, and to realize scalability by a multistage connection configuration.

18 Claims, 20 Drawing Sheets

FOREIGN PATENT DOCUMENTS

| | | |
|---|---|---|
| JP | 2002-261806 | 9/2002 |
| JP | 2002-262319 | 9/2002 |
| JP | 2003-235061 | 8/2003 |
| JP | 2004-235741 | 8/2004 |
| JP | 2005-252362 | 9/2005 |
| WO | WO 2004/071033 A1 | 8/2004 |
| WO | WO 2004/073225 A1 | 8/2004 |

OTHER PUBLICATIONS

"Computer Network Forth Edition", Publishing House of Electronics Industry, Jul. 31, 2003, pp. 170-171 (with partial English translation).

* cited by examiner

FIG.2
(a)
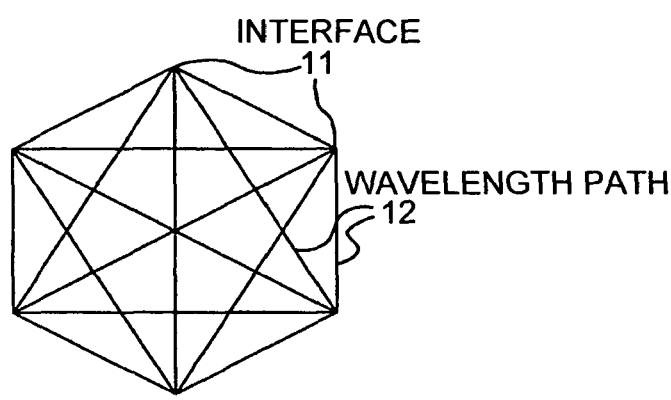
(b)
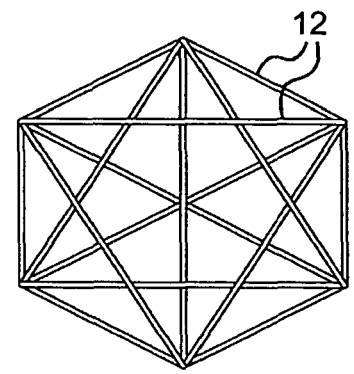
(c)
|  | RECEPTION INTERFACE NUMBER | | | | |
|---|---|---|---|---|---|
|  |  | 1 | 2 | 3 | ... | n |
| TRANSMISSION INTERFACE NUMBER | 1 |  | $\lambda 1$ | $\lambda 2$ | ... | $\lambda n{-}1$ |
|  | 2 | $\lambda n{-}1$ |  | $\lambda 1$ | ... | $\lambda n{-}2$ |
|  | 3 | $\lambda n{-}2$ | $\lambda n{-}1$ |  | ... | $\lambda n{-}3$ |
|  | ... | ... | ... | ... | ... | ... |
|  | n | $\lambda 1$ | $\lambda 2$ | $\lambda 3$ | ... |  |

FIG.19

| CORRESPONDING ROUTING TABLE | DESCRIPTION RULE OF ROUTING TABLE | |
|---|---|---|
| | DESTINATION IP ADDRESS | TRANSMISSION SOURCE PORT |
| SUBSCRIBER ACCOMMODATING NETWORK | OUT OF RANGE BELONGING TO SUBSCRIBER NETWORK ITSELF | PORT CORRESPONDING TO WAVELENGTH PATH TO RELAY NODE |
| | WITHIN RANGE BELONGING TO EDGE NODE ITSELF | PORT CORRESPONDING TO WAVELENGTH PATH BELONGING TO OWN EDGE NODE |
| | WITHIN RANGE BELONGING TO THE OTHER EDGE NODE (NUMBER i) | SUB-PORT CORRESPONDING TO WAVELENGTH PATH TO EDGE NODE (NUMBER i) |
| RELAY NETWORK | WITHIN RANGE BELONGING TO OWN RELAY NODE | PORT CORRESPONDING TO WAVELENGTH BELONGING TO OWN RELAY NODE |
| | WITHIN RANGE BELONGING TO EDGE NODE (NUMBER k) OF SUBSCRIBER ACCOMMODATING NETWORK (NUMBER j) CONNECTED TO OWN RELAY NODE | SUB-PORT CORRESPONDING TO WAVELENGTH PATH TO EDGE NODE (NUMBER k) OF PORT CORRESPONDING TO SUBSCRIBER ACCOMMODATING NETWORK (NUMBER j) |
| | WITHIN RANGE BELONGING TO OTHER RELAY NODE (NUMBER l) AND WITHIN RANGE BELONGING TO SUBSCRIBER ACCOMMODATING NETWORK CONNECTED TO OTHER RELAY NODE (NUMBER l) | SUB-PORT CORRESPONDING TO WAVELENGTH PATH TO RELAY NODE (NUMBER l) OF PORT CORRESPONDING TO RELAY NETWORK |

PACKET COMMUNICATION NETWORK AND PACKET COMMUNICATION METHOD

TECHNICAL FIELD

The present invention relates to a packet communication network and a packet communication method capable of establishing a direct communication between edge nodes or the like that accommodate subscribers and capable of ensuring scalability.

BACKGROUND ART

An existing telephone network adopts a hierarchical switching mechanism for ensuring scalability (see Nonpatent Literature 1). If users accommodated in different subscriber switchboards in the same prefecture are to hold a telephone communication, the communication is held via a prefecture's key switchboard. Due to this, traffic of the prefecture's key switchboard increases. If traffic congestion occurs, it is disadvantageously difficult to hold a telephone communication between the users accommodated in different subscriber switchboards in the same prefecture.

At present, IP telephony-based telephone network is available thanks to the VoIP technique. In the IP network, however, if a network apparatus such as a router or a switch adopts the same configuration as that of the telephone network, the same problem occurs to the IP telephone network similarly to the existing telephone network.

To solve this problem, one solution has been proposed and realized by a configuration in which subscriber routers or the like are connected to one another in a full-mesh fashion (see Nonpatent Literature 2).

Nonpatent Literature 1: "Technical Reference Materials, Telephone Service Interface, Fifth Edition", [online], Nippon Telegraph and Telephone Corporation, [searched on Oct. 7, 2004], Internet <URL: http://www.ntt-east.co.jp/gisanshi/analog/edit5j.pdf>

Nonpatent Literature 2: "Connection Environment of Internet VPN and their functions for administrators (Part 1)", [online], 2000/3/6, Atmark IT, [Searched on Oct. 7, 2004], Internet <URL: http://www.atmarkit.co.jp/fsecurity/special/38vpn/vpn02.html>

DISCLOSURE OF INVENTION

Problem to be Solved by the Invention

However, the number of full-mesh connections is in the order of the square of the number of subscriber routers. In present situations, therefore, it is essentially difficult to construct a full-mesh network in a large-scale network.

Meanwhile, the VoIP network that follows the existing telephone network structure is confronted with congestion-related problems such as inability to hold a direct communication between subscriber accommodating routers although it can ensure scalability.

Means for Solving Problem

The problems can be solved by adopting novel characteristic constitutions, methods, and means of the present invention as will be listed below.

A packet communication network according to one aspect of the present invention includes at least two full-mesh wavelength-division-multiplexing transmission units, each of which includes n number of interfaces, and is capable of establishing a bidirectional full-mesh communication between all of the interfaces using a wavelength path based on a wavelength-division-multiplexing technique, where n is an integer equal to or greater than 3; an edge-packet transfer unit that includes at least a packet recognizing unit, an external-packet transmitting/receiving unit, and an internal-packet transmitting/receiving unit, and is connected to the interface of the full-mesh wavelength-division-multiplexing transmission unit; and an internetwork connection unit that includes at least a packet recognizing unit and a packet transmitting/receiving unit, and connects the full-mesh wavelength-division-multiplexing transmission units in a multistage tree-shaped structure through the edge-packet transfer units. The packet recognizing units of the edge-packet transfer unit and the internetwork connection unit identify the edge-packet transfer unit that is a destination of a packet from a header of the packet. The external-packet transmitting/receiving unit of the edge-packet transfer unit inputs a packet received from outside to the internal-packet transmitting/receiving unit, and transmits a packet output from the internal-packet transmitting/receiving unit to the outside. The internal-packet transmitting/receiving unit of the edge-packet transfer unit transmits the packet input from the external-packet transmitting/receiving unit to the wavelength path of the full-mesh wavelength-division-multiplexing transmission unit corresponding to the edge-packet transfer unit that is the destination of the packet identified by the packet recognizing unit, if the destination of the packet identified by the packet recognizing unit is other edge-packet transfer unit connected to the full-mesh wavelength-division-multiplexing transmission unit, transmits the packet input from the external-packet transmitting/receiving unit to the wavelength path of the full-mesh wavelength-division-multiplexing transmission unit corresponding to the other edge-packet transfer unit, and if the destination of the packet identified by the packet recognizing unit is the edge-packet transfer unit of its own or the edge-packet transfer unit that is not connected to the full-mesh wavelength-division-multiplexing transmission unit, transmits the packet input from the external-packet transmitting/receiving unit to the external-packet transmitting/receiving unit. The packet transmitting/receiving unit of the internetwork connection unit transmits the packet received from the edge-packet transfer unit to the edge-packet transfer unit that is the destination of the packet identified by the packet recognizing unit.

According to the present invention, the full-mesh wavelength-division-multiplexing transmission units include physically-independent plural full-mesh wavelength-division-multiplexing transmission units arranged in parallel. The edge-packet transfer unit includes a first edge-packet transfer unit connected to one of the full-mesh wavelength-division-multiplexing transmission units and the internetwork connection unit; and a second edge-packet transfer unit connected to all of the full-mesh wavelength-division-multiplexing transmission units. The internetwork connection unit includes a switching unit that is provided on an input side of the packet transmitting/receiving unit and switches over destinations of a plurality of packets received from a plurality of first edge-packet transfer units connected to the full-mesh wavelength-division-multiplexing transmission units, respectively, to determine a plurality of other first edge-packet transfer units connected to a plurality of other full-mesh wavelength-division-multiplexing transmission units that are the destinations of the packets. The internal-packet transmitting/receiving unit of the second edge-packet transfer unit-transmits the packet input from the external-packet transmitting/receiving unit simultaneously to same-wavelength paths of the full-mesh wavelength-division-multiplexing transmission units corresponding to the first edge-packet transfer unit or the second edge-packet transfer unit that is the destination of the packet identified by the packet recognizing unit, if the destination of the packet identified by the packet recognizing unit is other first edge-packet transfer unit or second edge-packet transfer unit connected to the full-mesh wavelength division multiplexing units, transmits a plurality of packets input from the same-wavelength paths of the full-mesh wavelength-division-multiplexing transmission units simultaneously to the same-wavelength paths of the full-mesh wavelength division multiplexing units corresponding to the other first edge-packet transfer unit or second edge-packet transfer unit, and if the destination of the packet identified by the packet recognizing unit is the second edge-packet transfer unit itself or first edge-packet transfer unit or second edge-packet transfer unit that is not connected to the full-mesh wavelength division multiplexing units, selects one of the packets, and transmits the selected packet to the external-packet transmitting/receiving unit.

According to the present invention, the internetwork connection unit includes an important communication processing unit that extracts and compares important communication packets from the packets received from the first edge transfer units connected to the wavelength division multiplexing transmission units, respectively, and if there is a packet loss in one packet, copies other packet corresponding the one packet.

According to the present invention, the edge-packet transfer unit includes a packet recognizing unit that identifies the edge-packet transfer unit that is the destination of the packet and a service from a header of the packet; and a packet processing unit that processes the packet received from the external-packet transmitting/receiving unit into a packet form for a communication method used by the full-mesh wavelength-division-multiplexing transmission unit if a communication method corresponding to the service identified by the packet recognizing unit differs from the communication method used by the full-mesh wavelength-division-multiplexing transmission unit, and processes the packet input from the full-mesh wavelength-division-multiplexing transmission unit to the internal-packet transmitting/receiving unit and output to the external-packet transmitting/receiving unit into the packet form for the communication method corresponding to the service identified by the packet recognizing unit if the communication method corresponding to the service differs from the communication method used by the full-mesh wavelength division multiplexing unit.

The packet communication network according to the present invention further includes a gateway unit that connects a specific edge-packet transfer unit and an external network. The packet processing unit of the specific edge-packet transfer unit processes the packet output to the external-packet transmitting/receiving unit into the packet form for the communication method corresponding to the service identified by the packet recognizing unit if the service is a service for connecting the specific edge-packet transfer unit and the external network. The external-packet transmitting/receiving unit transmits the processed packet to the gateway unit corresponding to the external network.

According to the present invention, the edge-packet transfer unit includes a resource management unit that manages resource states of all of the wavelength paths related to an interface of each of the full-mesh wavelength-division-multiplexing transmission units, the interface connecting the edge-packet transfer unit; and a resource-information transfer unit that transfers information on the resource states as a packet.

According to the present invention, when transmitting the packet input from the external-packet transmitting/receiving unit or the full-mesh wavelength division multiplexing unit, the destination of which identified by the packet recognizing unit is the other edge-packet transfer unit connected to the full-mesh wavelength-division-multiplexing transmission unit, to the wavelength path of the full-mesh wavelength-division-multiplexing transmission unit corresponding to the other edge-packet transfer unit, the internal-packet transmitting/receiving unit of the edge-packet transfer unit transmits the packet to other wavelength path if the resource state of the wavelength path is determined to be equal to or higher than a threshold based on resource state information on the wavelength path managed by the resource management unit.

According to the present invention, in a communication for exercising a call admission control by transmitting a call control packet of a call request or a call response to a control server that includes a call-admission control unit, the external-packet transmitting/receiving unit or the internal-packet transmitting/receiving unit of the edge-packet transfer unit adds resource state information managed by the resource management unit to the call control packet when a type of the packet identified by the packet recognizing unit is the call control packet.

Effect of the Invention

The first packet communication network makes it possible to hold a direct communication among edge-packet transfer units accommodating subscribers within the same full-mesh wavelength division multiplexing unit, to realize a stable communication that is important for VoIP or the like that is not influenced by the other traffic and congestion, and to simultaneously realize the scalability by the multistage connection configuration.

Only by transmitting the packet to the wavelength path corresponding to the destination, the corresponding wavelength path can be easily identified from a full-mesh, tree multistage connection topology. Routing management can be, therefore, simplified. It is thereby possible to realize facilitation of operation management, facilitation of fault segmentation, and the like.

The second packet communication network makes it possible to construct a highly reliable network by holding the redundant communication.

The third packet communication network can improve the reliability of an important communication such as VoIP-based 110 or 119 dialing.

The fourth packet communication network makes it possible to realize a plurality of network services such as VoIP, SIP connection, and VPN by one network.

The fifth packet communication network makes it possible to realize an external connection such as VoIP-based interconnection, ISP connection, and VPN.

The sixth packet communication network makes it possible for an operation system or any one of various servers to easily manage a traffic state and the like of the network.

The seventh packet communication network makes it possible to transfer a best effort communication or the like using a path with less heavy traffic, and to realize effective use of network resources and measures against congestion. In addition, since a detour communication can be held without changing the IP routing, it is possible to facilitate the operation management and to reduce switching time for the detour.

The eighth packet communication network makes it possible to easily grasp the resources using the control communication such as the present SIP in the VoIP communication, and to realize the call admission control. In addition, since the call admission control is realized using the control communication such as the SIP, the call admission control can be realized with hardly increasing a call setting time.

BRIEF DESCRIPTION OF DRAWINGS

FIG. 2 is a schematic block diagram of a full-mesh wavelength-division-multiplexing transmission unit shown in FIG. 1;

FIG. 19 is an explanatory view of one example of an edge node IP routing table.

Figure 1:
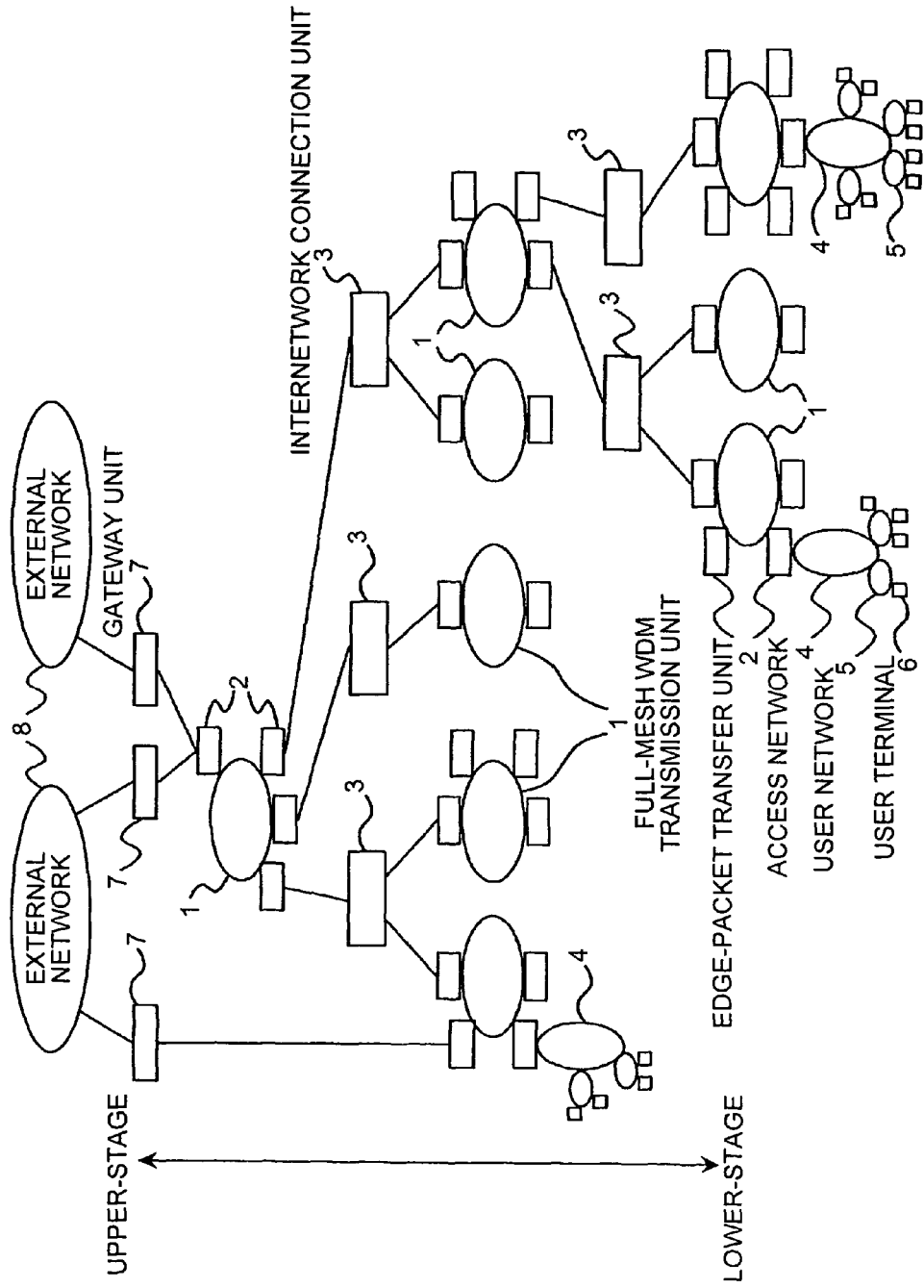
FIG. 1 is a block diagram of a packet communication network according to a first embodiment of the present invention.

EXPLANATIONS OF LETTERS OR NUMERALS 1, 1a, 1b Full-mesh wavelength-division-multiplexing transmission unit
1c Subscriber accommodating network
1d Relay network
2 Edge-packet transfer unit
2c Edge node
2d Relay node
3, 30 Internetwork connection unit
4 Access network
5 User network
6 User terminal
7 Gateway unit
8 External network
11 Interface
12 Wavelength path
13 Wavelength path that can manage resource state
14 Alternative wavelength path
20, 200 Internetwork-connection and edge-packet transfer unit
21, 31 Packet recognizing unit
22 External-packet transmitting/receiving unit
23 Internal-packet transmitting/receiving unit
24 Packet processing unit
25 Resource management unit
26 Resource-information transfer unit
27, 27' Upper-stage-packet transmitting/receiving unit
28, 28' Lower-stage-packet transmitting/receiving unit
29, 33 Switching unit
32 Packet transmitting/receiving unit
34 Important communication processing unit

BEST MODE(S) FOR CARRYING OUT THE INVENTION

Exemplary embodiments of the present invention will be explained in detail below with reference to the accompanying drawings.

First Embodiment

FIG. 1 is a block diagram of a packet communication network according to the first embodiment of the present invention. In FIG. 1, reference numeral 1 denotes a full-mesh wavelength division multiplexing (WDM) transmission unit, 2 denotes an edge-packet transfer unit, 3 denotes an internetwork connection unit, 4 denotes an access network, 5 denotes a user network, 6 denotes a user terminal, 7 denotes a gateway unit, and 8 denotes an external network.

The edge-packet transfer unit 2 is connected to an interface (to be explained later) of the full-mesh WDM transmission unit 1. Two or more full-mesh WDM transmission units 1 are connected in a multistage tree-shaped structure through the edge-packet transfer units 2 by the internetwork connection units 3. The packet communication network according to the present invention (hereinafter, "full-mesh multistage network") is thereby constituted.

In this connection, the internetwork connection unit 3 is connected to the edge-packet transfer unit 2 connected to the upper-stage full-mesh WDM transmission unit 1 by one-to-one correspondence, and connected to the edge-packet transfer unit 2 connected to the lower-stage full-mesh WDM transmission unit 1 by one-to-one or one-to-many correspondence. Furthermore, the user terminal 6 is connected to the edge-packet transfer unit 2 through the access network 4 and the user network 5, and the external network 8 is connected to the edge-packet transfer unit 2 through the gateway unit 7.

As shown in FIG. 2(a), the full-mesh WDM transmission unit 1 includes n (where n is an integer equal to or greater than 3) or, in the present embodiment, six interfaces 11. The full-mesh WDM transmission unit 1, therefore, serves as optical transmission means (or an optical network) capable of establishing full-mesh bidirectional communications among all the interfaces 11 by wavelength paths 12 based on a WDM technique (it is noted that the unit 1 is the optical transmission means in FIG. 2(a)). As shown in FIG. 2(b), each wavelength path 12 is constituted by up and down, i.e., bidirectional wavelength paths. The wavelength path 12 is configured so that a transmitting wavelength path from one interface to the other interfaces has different wavelengths for the respective other interfaces (destinations), and so that a receiving wavelength path from the other interfaces to one interface has different wavelengths for the respective interfaces (transmission sources). By so configuring, it is possible to realize an input interface and an output interface of the full-mesh WDM transmission unit 1 using one optical fiber according to the WDM. In addition, by recognizing only the wavelength, it is possible to recognize from which interface a communication is started.

The full-mesh WDM transmission unit that satisfies these conditions can be realized by a star network based on optical crossconnect using the well-known WDM technique. With the actual WDM technique, there is a limit to the number of wavelengths. However, by adopting a wavelength configuration shown in FIG. 2(c), the above-stated conditions can be satisfied by a minimum number of, i.e., (n−1) wavelengths relative to the number of interfaces n. Therefore, the full-mesh WDM transmission means including ((the limit number of wavelengths according to the WDM)+1) interfaces (for which a pair of transmission and reception interfaces are counted one interface) can be realized.

Furthermore, the full-mesh WDM transmission means can be realized by a ring network based on OADM (Optical Add/Drop Multiplexer) or the like using the well-known WDM.

In this case, however, the number of necessary wavelengths is larger than the minimum number of wavelengths.

Figure 3:
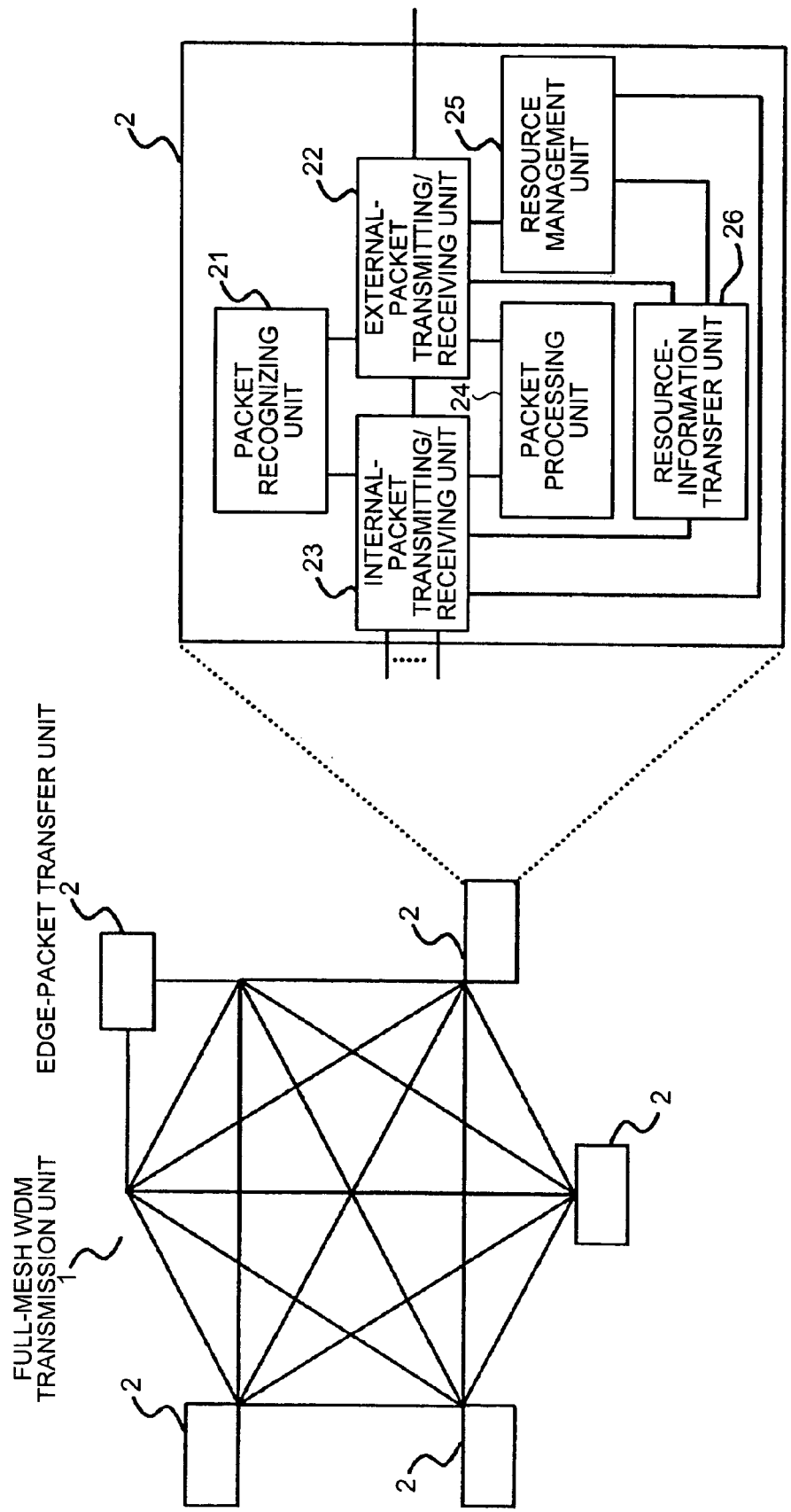
FIG. 3 is a detailed block diagram of an edge-packet transfer unit shown in FIG. 1.

As shown in FIG. 3, the edge-packet transfer unit 2 includes a packet recognizing unit 21, an external-packet transmitting/receiving unit 22, an internal-packet transmitting/receiving unit 23, a packet processing unit 24, a resource management unit 25, and a resource-information transfer unit 26 (among which, the packet processing unit 24, the resource management unit 25, and the resource-information transfer unit 26 will not be explained herein). One edge-packet transfer unit 2 can be connected to a plurality of interfaces of the same full-mesh WDM transmission unit 1.

The packet recognizing unit 21 recognizes the edge-packet transfer unit that serves as a destination of a packet from a header of the packet. The external-packet transmitting/receiving unit 22 inputs a packet received from an outside to the internal-packet transmitting/receiving unit 23, and transmits a packet output from the internal-packet transmitting/receiving unit 23 to the outside.

The internal-packet transmitting/receiving unit 23 transmits the packet input from the external-packet transmitting/receiving unit 22 to the wavelength path of the full-mesh WDM transmission unit corresponding to the destination edge-packet transfer unit recognized by the packet recognizing unit 21. If the destination recognized by the packet recognizing unit 21 is the other edge-packet transfer unit connected to the full-mesh WDM transmission unit, the internal-packet transmitting/receiving unit 23 transmits the packet input from the full-mesh WDM transmission unit to the wavelength path of the full-mesh WDM transmission unit corresponding to the other edge-packet transfer unit. If the destination recognized by the packet recognizing unit 21 is the edge-packet transfer unit itself or the edge-packet transfer unit that is not connected to the full-mesh WDM transmission unit, the internal-packet transmitting/receiving unit 23 outputs the packet to the external-packet transmitting/receiving unit 22.

Figure 4:
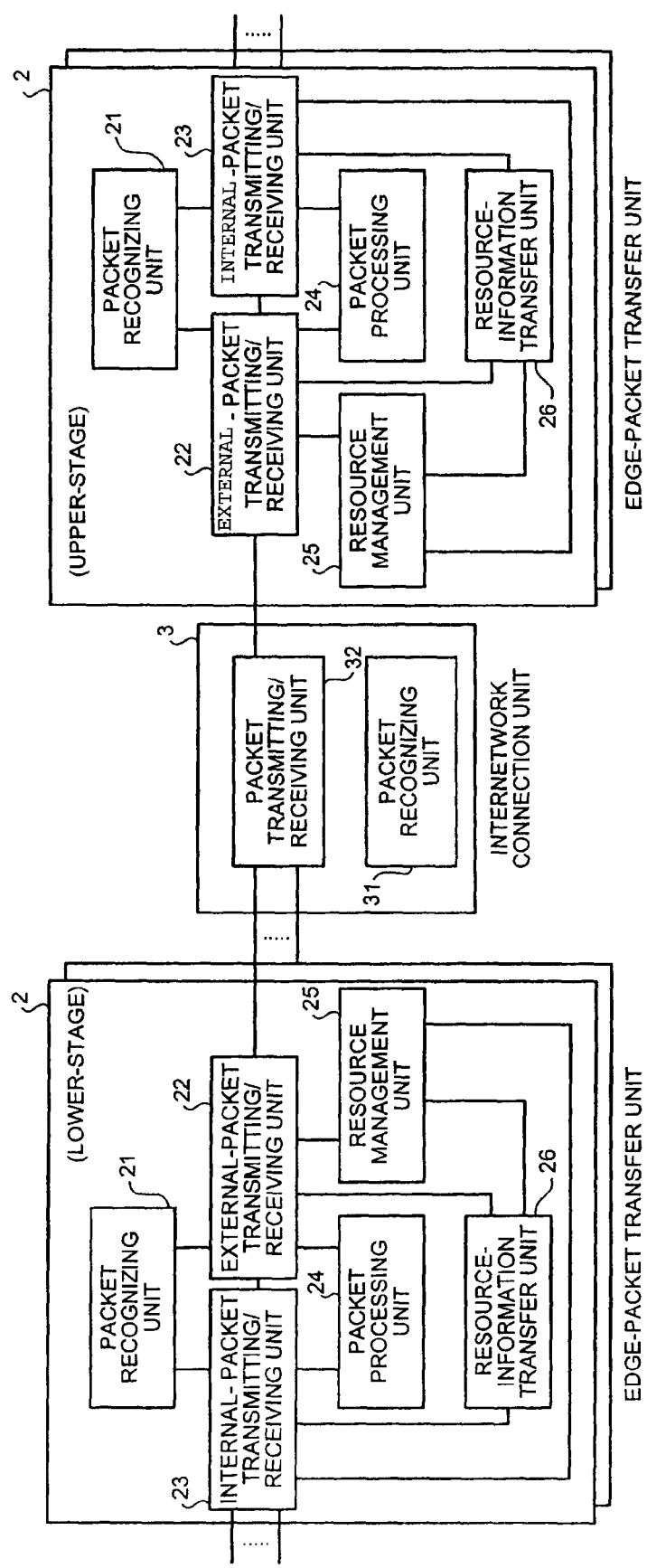
FIG. 4 is a detailed block diagram of an internetwork connection unit as well as the edge-packet transfer unit shown in FIG. 1.

As shown in FIG. 4, the internetwork connection unit 3 includes a packet recognizing unit 31 and a packet transmitting/receiving unit 32. FIG. 4 depicts not only the internetwork connection unit 3 but also the upper-stage and lower-stage edge-packet transfer units 2 connected to the internetwork connection unit 3.

The packet recognizing unit 31 recognizes the destination edge-packet transfer unit from the header of the packet. The packet transmitting/receiving unit 32 transmits the packet received from the edge-packet transfer unit 2 to the destination edge-packet transfer unit 2 recognized by the packet recognizing unit 31.

Figure 5:
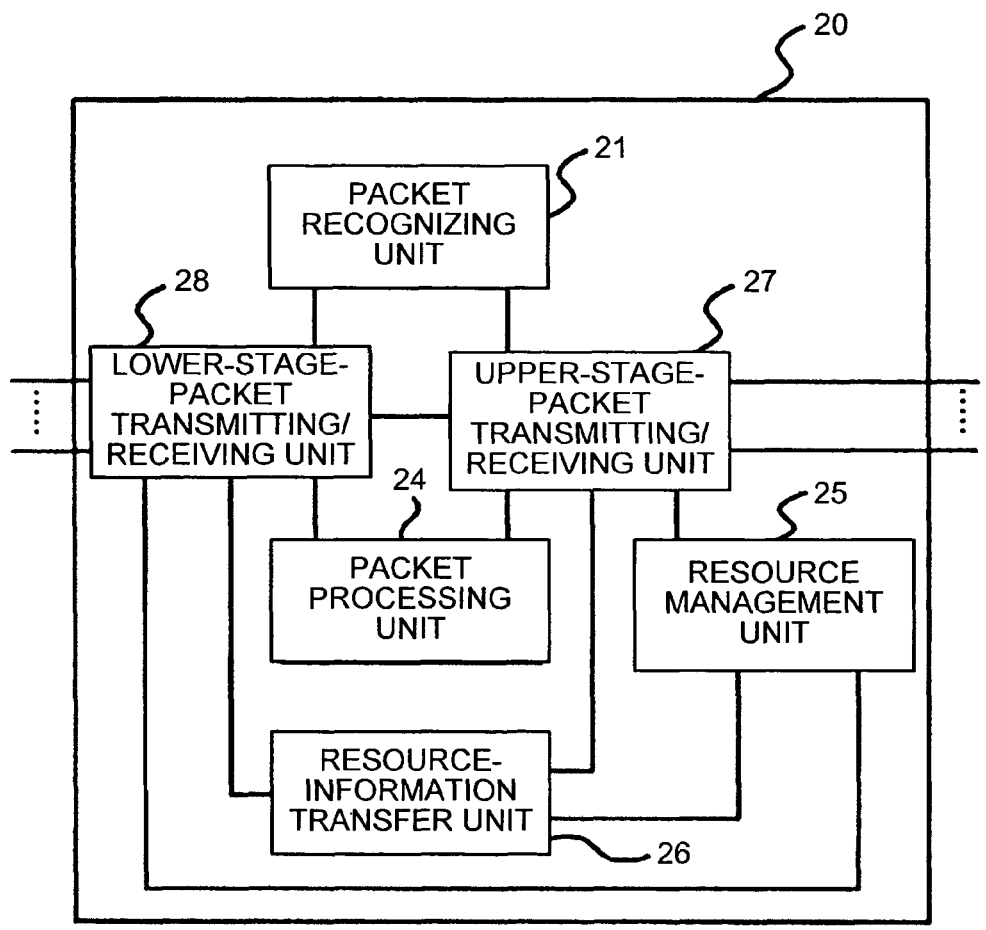
FIG. 5 is a block diagram of an internetwork-connection and edge-packet transfer unit obtained by integrating the edge-packet transfer unit with the internetwork connection unit shown in FIG. 1.

If the internetwork connection unit 3 and all the edge-packet transfer units 2 connected to this internetwork connection unit 3 are functionally integrated together, an internetwork-connection and edge-packet transfer unit 20 as shown in FIG. 5 can be constituted. In FIG. 5, the same constituent elements as those shown in FIG. 3 are denoted by the same reference letters or numerals, respectively. In FIG. 5, reference numeral 21 denotes the packet recognizing unit, 27 denotes an upper-stage-packet transmitting/receiving unit, and 28 denotes a lower-stage-packet transmitting/receiving unit.

The upper-stage-packet transmitting/receiving unit 27 is connected to the interface of the upper-stage full-mesh WDM transmission unit 1. In addition, the upper-stage-packet transmitting/receiving unit 27 realizes functions of the internal-packet transmitting/receiving unit and the external-packet transmitting/receiving unit of the upper-stage edge-packet transfer unit 2. The lower-stage-packet transmitting/receiving unit 28 is connected to the interface of the lower-stage full-mesh WDM transmission unit 1. In addition, the lower-stage-packet transmitting/receiving unit 28 realizes functions of the internal-packet transmitting/receiving unit and the external-packet transmitting/receiving unit of the lower-stage edge-packet transfer unit 2, and of the packet transmitting/receiving unit of the internetwork connection unit 3.

The upper-stage-packet transmitting/receiving unit 27 is often connected to a plurality of interfaces of the same full-mesh WDM transmission unit 1. The lower-stage-packet transmitting/receiving unit 28 is often connected to a plurality of interfaces of either the different full-mesh WDM transmission units 1 or the same full-mesh WDM transmission unit 1. The access network 4 is connected to the lower-stage-packet transmitting/receiving unit 28.

An operation of the packet communication network according to the present embodiment will be explained.

In the edge-packet transfer unit 2, the packet recognizing unit 21 recognizes the edge-packet transfer unit 2 that is to serve (not a final destination but) a next destination of the packet received by the external-packet transmitting/receiving unit 22 (from the user terminal 6 connected to the user network 5 through the access network 4 or the like) from a destination address, a packet type, and the like of the packet. Based on this information, the internal-packet transmitting/receiving unit 23 transmits the packet to the wavelength path of the full-mesh WDM transmission unit 1 corresponding to the next destination edge-packet transfer unit 2.

In the edge-packet transfer unit 2 that faces this wavelength path, the packet recognizing unit 21 recognizes the edge-packet transfer unit 2 that is to serve a next destination of the packet received by the internal-packet transmitting/receiving unit 23. In addition, the external-packet transmitting/receiving unit 22 or the internal-packet transmitting/receiving unit 23 corresponding to the next destination edge-packet transfer unit 2 transmits the packet (it is noted that if the next destination edge-packet transfer unit is this edge-packet transfer unit itself, the external-packet transmitting/receiving unit 22 is responsible for transmitting the packet).

If the external-packet transmitting/receiving unit 22 is connected to the internetwork connection unit 3, the packet recognizing unit 31 of the internetwork connection unit 3 recognizes the edge-packet transfer unit 2 that is to serve the next destination of the packet received by the packet transmitting/receiving unit 32 of the internetwork connection unit 3. In addition, the packet transmitting/receiving unit 32 transmits the packet to the next destination edge-packet transfer unit 2.

If the internetwork-connection and edge-packet transfer unit 20 shown in FIG. 5 is employed, the packet recognizing unit 21 recognizes the edge-packet transfer unit 2 that is to serve the next destination of the packet received by the upper-stage-packet transmitting/receiving unit 27 or the lower-stage-packet transmitting/receiving unit 28. The upper-stage-packet transmitting/receiving unit 27 or the lower-stage-packet transmitting/receiving unit 28 corresponding to the next destination edge-packet transfer unit 2 (when the next destination edge-packet transfer unit is the edge-packet transfer unit 20 itself, the lower-stage-packet transmitting/receiving unit 28 corresponds to the next destination edge-packet transfer unit) transmits the packet.

This processing is repeatedly performed until the packet is transmitted from the external-packet transmitting/receiving unit 22 of the final edge-packet transfer unit 2 (which serves as the next destination edge-packet transfer unit and to which the user network 5 connected to the destination user terminal 6 is connected through the access network 4). It is thereby possible to realize a desired packet communication by the full-mesh multistage network.

Figure 6:
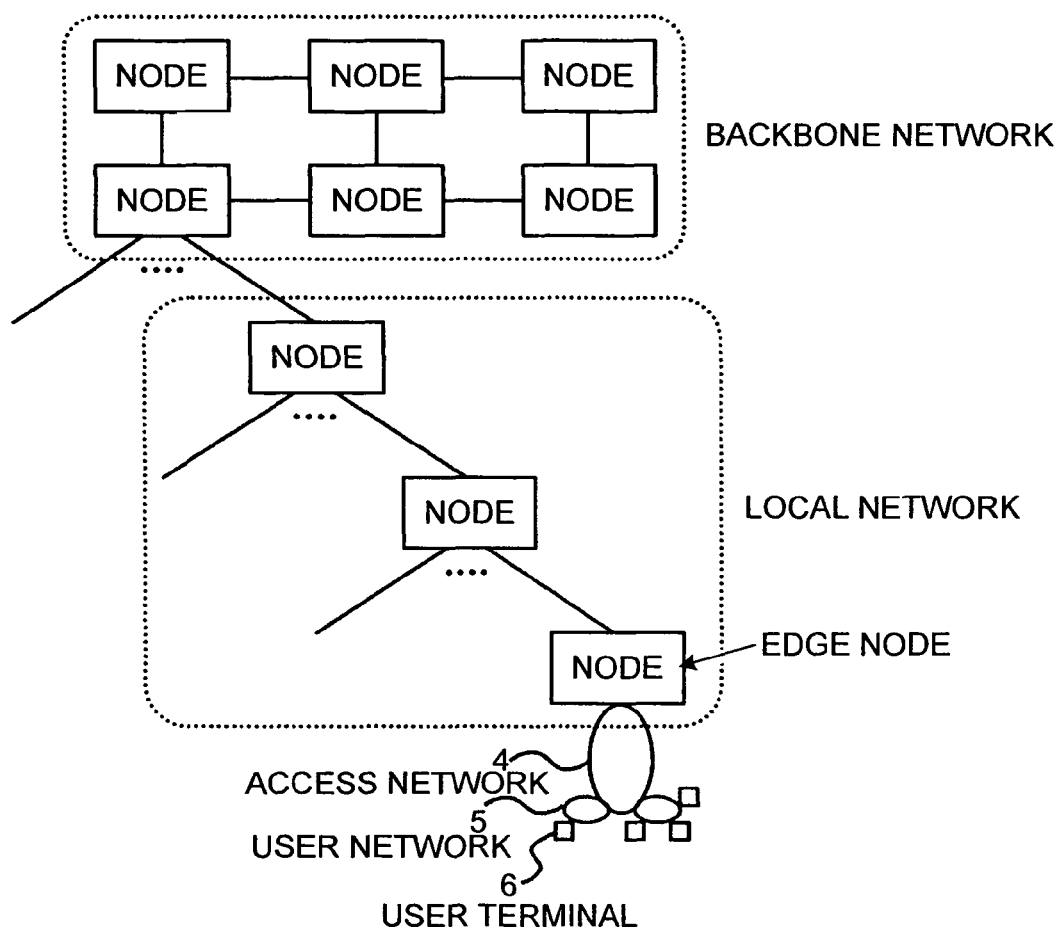
FIG. 6 is a block diagram of one example of an ordinary large-scale IP network.

In an ordinary large-stage IP network as shown in FIG. 6, it is necessary to establish a communication between edge nodes within a local network via a higher node. In the full-mesh multistage network, by contrast, the packet communication is not influenced by the other traffic or congestion since the edge-packet transfer units 2 can hold a direct communication for one full-mesh WDM transmission unit 1. Thanks to this, a stable communication with smaller delays, jitters or the like with which the VoIP network is confronted can be established. In a user-to-user communication such as a telephone call or the like, traffic of short-distance communications such as those within the same prefecture is heavy. Such network configuration is, therefore, effective for the user-to-user communication.

On the other hand, because of the limit to the number of wavelengths or the like according to the WDM technique, the single full-mesh WDM transmission unit 1 is inferior in scalability. However, by adopting the multistage connection configuration in which a plurality of full-mesh WDM transmission units 1 are connected to one another in a multistage structure through the edge-packet transfer units 2 and the internetwork connection units 3, it is possible to simultaneously realize high scalability and high expandability of the network.

Furthermore, in the packet transfer operation, the simple configuration of only transmitting the packet to the wavelength paths corresponding to the destination enables each of the corresponding wavelength paths to be easily recognized from a simple topology in which the multistage full-mesh WDM transmission units are connected in the form of a tree. It is thereby possible to simplify realization and management of transfer, facilitate network operation management, and realize facilitating fault segmentation and the like.

Second Embodiment

Figure 7:
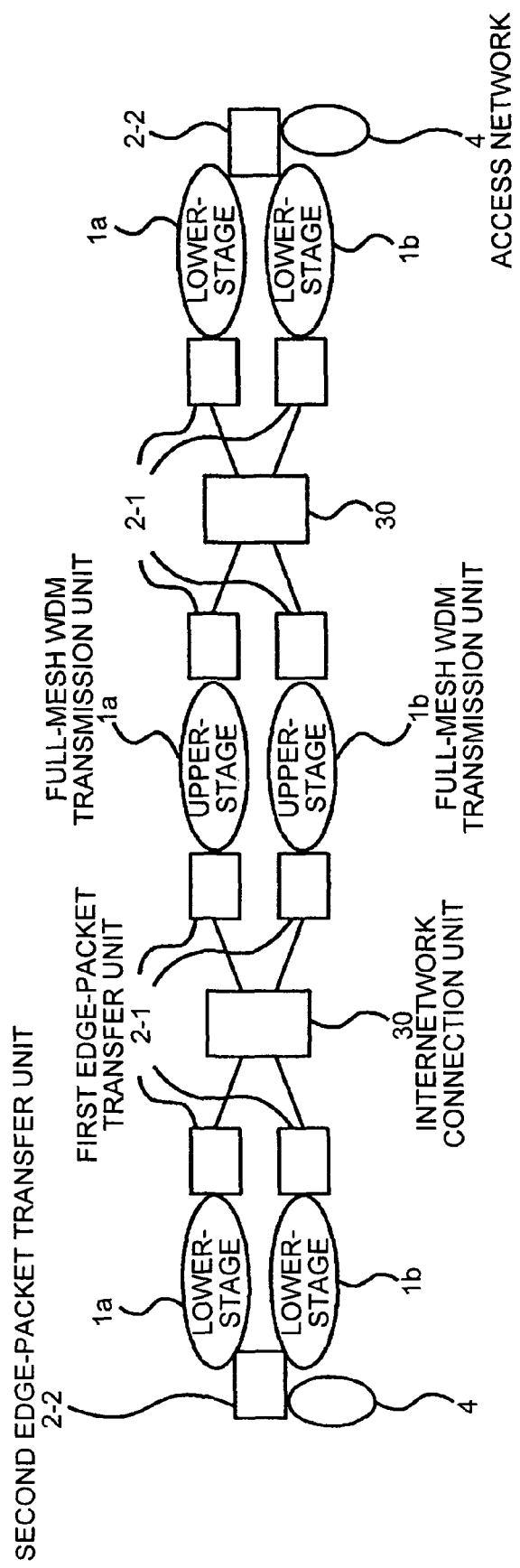
FIG. 7 is a block diagram of a packet communication network according to a second embodiment of the present invention.

FIG. 7 depicts a packet communication network according to the second embodiment of the present invention. In FIG. 7, the same constituent elements are denoted by the same reference letters or numerals, respectively. Namely, reference letters and numerals 1a and 1b denote full-mesh WDM transmission units, 2-1 denotes a first edge-packet transfer unit, 2-2 denotes a second edge-packet transfer unit, and 30 denotes an internetwork connection unit.

The full-mesh WDM transmission units 1a and 1b are a plurality of full-mesh WDM transmission units physically independent of each other and parallel to each other. Each of the full-mesh WDM transmission units 1a and 1b is the same as the full-mesh WDM transmission unit 1 explained in the first embodiment.

Different first edge-packet transfer units 2-1 or the same second edge-packet transfer unit 2-2 is connected to interfaces of the full-mesh WDM transmission units 1a and 1b. Two or more or, in the present embodiment, three pairs of full-mesh WDM transmission units 1a and 1b are connected in a multistage tree-shaped structure by the internetwork connection units 30 through the first edge-packet transfer units 2-1. A full-mesh multistage network having a redundant configuration is thereby constituted.

The first edge-packet transfer unit 2-1 is equal in both configuration and operation to the edge-packet transfer unit 2 explained in the first embodiment. Likewise, the second edge-packet transfer unit 2-2 is equal to the edge-packet transfer unit 2 explained in the first embodiment except for the internal-packet transmitting/receiving unit.

The internal-packet transmitting/receiving unit of the second edge-packet transfer unit 2-2 includes input and output ports corresponding to each of the full-mesh WDM transmission units 1a and 1b. The internal-packet transmitting/receiving unit simultaneously outputs packets input from the external-packet transmitting/receiving unit to equal wavelength paths of the full-mesh WDM transmission units 1a and 1b corresponding to the first or second edge-packet transfer unit recognized as a destination by the packet recognizing unit. In addition, the internal-packet transmitting/receiving unit outputs a plurality of packets input from the equal wavelength paths of the full-mesh WDM transmission units 1a and 1b to equal wavelength paths of the full-mesh WDM transmission unit 1a and 1b corresponding to the other first or second edge-packet transfer unit if a destination recognized by the packet recognizing unit is the other first or second edge-packet transfer unit connected to the full-mesh WDM transmission units 1a and 1b. If the destination recognized by the packet recognizing unit is the second edge-packet transfer unit itself or the first or second edge-packet transfer unit that is not connected to the full-mesh WDM transmission units 1a and 1b, the internal-packet transmitting/receiving unit of the second edge-packet transfer unit 2-2 selects one of the packets and outputs the selected packet to the external-packet transmitting/receiving unit.

Figure 8:
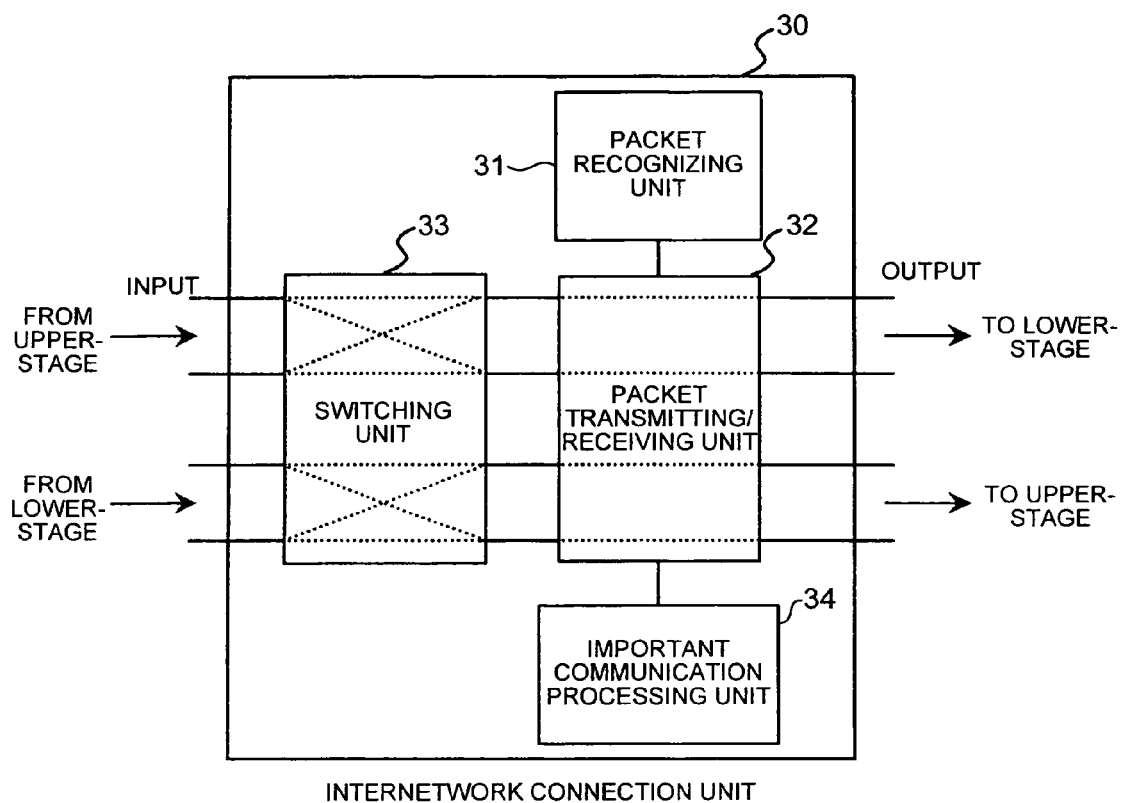
FIG. 8 is a detailed block diagram of an internetwork connection unit shown in FIG. 7.

As shown in FIG. 8, the internetwork connection unit 30 includes a packet recognizing unit 31, a packet transmitting/receiving unit 32, a switching unit 33, and an important communication processing unit 34 (among which, the important communication processing unit 34 will not be explained herein).

The switching unit 33 is provided on an input side of the packet transmitting/receiving unit 32. In addition, the switching unit 33 switches over between the other first edge-packet transfer units 2-1 connected to the other full-mesh WDM transmission units 1a and 1b that are destinations of a plurality of packets received from the first edge-packet transfer units 2-1 connected to the full-mesh WDM transmission units 1a and 1b, respectively, so as to transfer the packets to one of the other first edge-packet transfer units 2-1. It is assumed herein that this switching includes an instance of simultaneously transmitting one received packet to two or more other first edge-packet transfer units 2-1.

An operation of the packet communication network according to the present embodiment will be explained.

In the second edge-packet transfer unit 2-2, the internal-packet transmitting/receiving unit simultaneously outputs the packet received by the external-packet transmitting/receiving unit (from the user terminal on the user network through the access network or the like) to the wavelength paths of the full-mesh WDM transmission units 1a and 1b.

Examples of the simultaneous outputting method include a method by causing the internal-packet transmitting/receiving unit to duplicate the packet and a method by causing an optical splitter or the like to split an optical signal at an exit of the internal-packet transmitting/receiving unit.

In the internetwork connection unit 30, the switching unit 33 switches over the paths from the first edge-packet transfer units 2-1 to the other first edge-packet transfer units 2-1 on the opposite side (as indicated by broken lines in FIG. 8), thereby changing a communication configuration of each of the full-mesh WDM transmission units 1a and 1b. The packets output from the packet transmitting/receiving unit 32 can be thereby selected. If the same packet is to be simultaneously transmitted to the first edge-packet transfer units 2-1, the method by causing the switching unit 33 to duplicate the packet or the like is used.

The path switchover by the switching unit 33 during a fault or the like can be realized by automatically switching over an input to the packet transmitting/receiving unit 32 to the other parallel inputs using detection of an optical signal cutoff, detection of non-arrival of a test packet transmitted at certain intervals or the like as a trigger.

Figure 9:
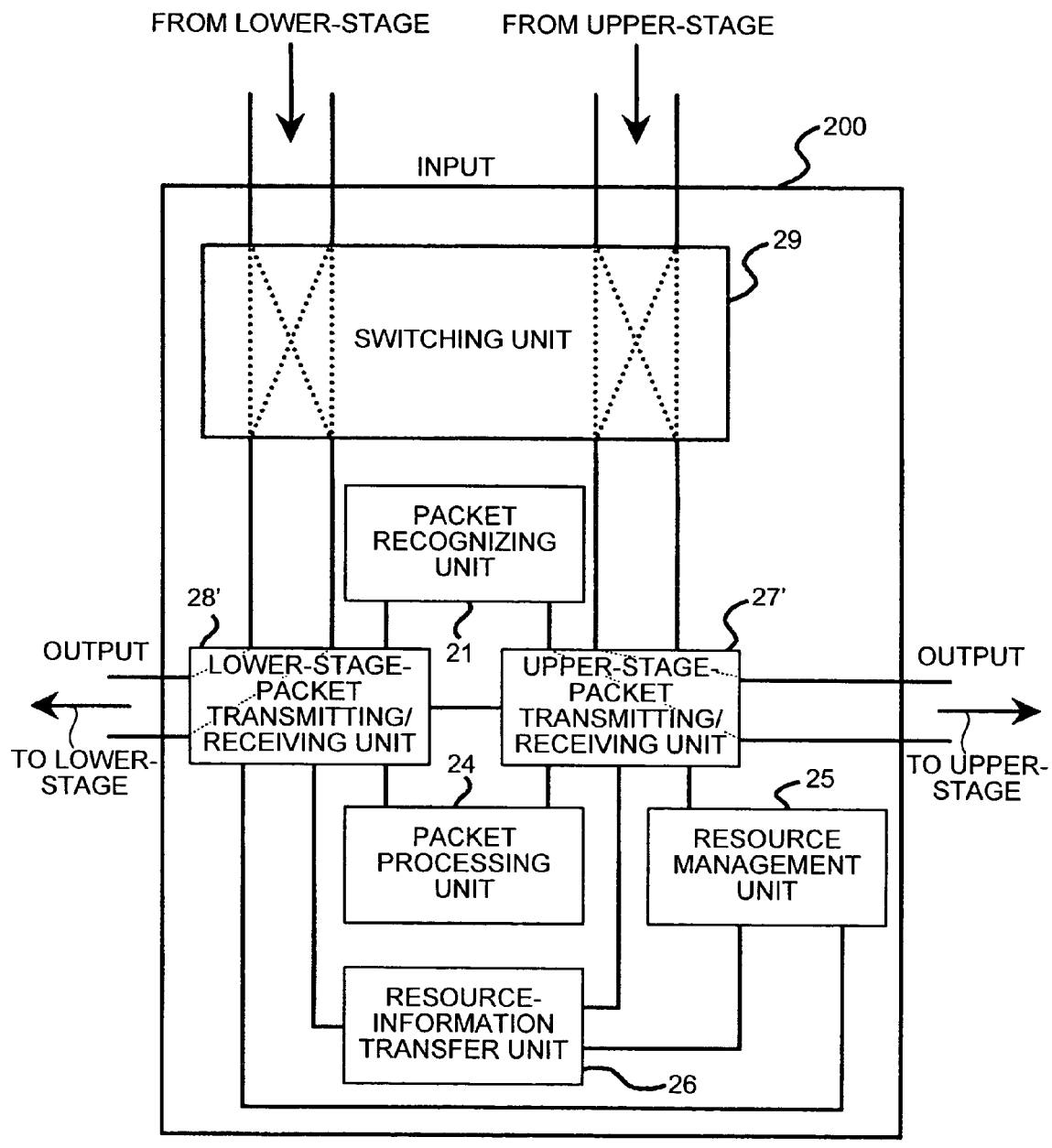
FIG. 9 is a block diagram of an internetwork-connection and edge-packet transfer unit obtained by integrating the edge-packet transfer unit with the internetwork connection unit shown in FIG. 7.

If the internetwork connection unit 30 and all the first edge-packet transfer units 2-1 connected to the internetwork connection unit 30 are functionally integrated together, an internetwork-connection and edge-packet transfer unit 200 as shown in FIG. 9 can be constituted. In FIG. 9, the same constituent elements as those shown in FIG. 5 are denoted by the same reference letters or numerals, respectively. In FIG. 9, reference numeral 21 denotes the packet recognizing unit, 27' denotes an upper-stage-packet transmitting/receiving unit, 28' denotes a lower-stage-packet transmitting/receiving unit, and 29 denotes a switching unit.

The upper-stage-packet transmitting/receiving unit 27' is connected to the interfaces of the upper-stage full-mesh WDM transmission units 1a and 1b. In addition, the upper-stage-packet transmitting/receiving unit 27' realizes functions of the internal-packet transmitting/receiving unit and the external-packet transmitting/receiving unit of the upper-stage first edge-packet transfer unit 2-1. The lower-stage-packet transmitting/receiving unit 28' is connected to the interfaces of the lower-stage full-mesh WDM transmission units 1a and 1b. In addition, the lower-stage-packet transmitting/receiving unit 28' realizes functions of the internal-packet transmitting/receiving unit and the external packet of the lower-stage first edge-packet transfer unit 2-1 and the packet transmitting/receiving unit of the internetwork connection unit 30.

The switching unit 29 is provided on input sides of the upper-stage-packet transmitting/receiving unit 27' and the lower-stage-packet transmitting/receiving unit 28'. In addition, the switching unit 29 switches over a transfer destination of each of the packets received by the respective full-mesh WDM transmission units 1a and 1b to the other full-mesh WDM transmission unit 1a or 1b.

In the final second edge-packet transfer unit 2-2 (to which the user network on which the destination user terminal is present is connected through the access network or the like), the internal-packet transmitting/receiving unit selects and outputs one of the packets received from the full-mesh WDM transmission units 1a and 1b. It is thereby possible to hold a redundant packet communication.

The internal-packet transmitting/receiving unit selects one of the packets as follows. Normally, the selected packet is fixed to the packet received from one of the full-mesh WDM transmission units 1a and 1b. During the fault or the like, the selected packet from the full-mesh WDM transmission unit 1a or 1b is automatically switched over to the packet received from the other full-mesh WDM transmission unit 1a or 1b using the detection of non-arrival of the test packet transmitted at certain intervals from the selected full-mesh WDM transmission unit or the like as a trigger.

Through these processings, a fault-tolerant redundant communication can be realized in the full-mesh multistage network that constitutes a redundant configuration, and reliability can be improved.

Using the full-mesh multistage network having the redundant configuration, the second edge-packet transfer unit outputs the packet received by the external-packet transmitting/receiving unit (from the user terminal on the user network through the access network or the like) to the wavelength paths of a plurality of parallel full-mesh WDM transmission units by load distribution. By doing so, not the redundant communication but a load distribution communication using multiple routes can be realized.

Examples of the method for transmitting the packet by the load distribution includes a method for causing the internal-packet transmitting/receiving unit to probabilistically distribute the packet to a plurality of wavelength paths.

Third Embodiment

Figure 10:
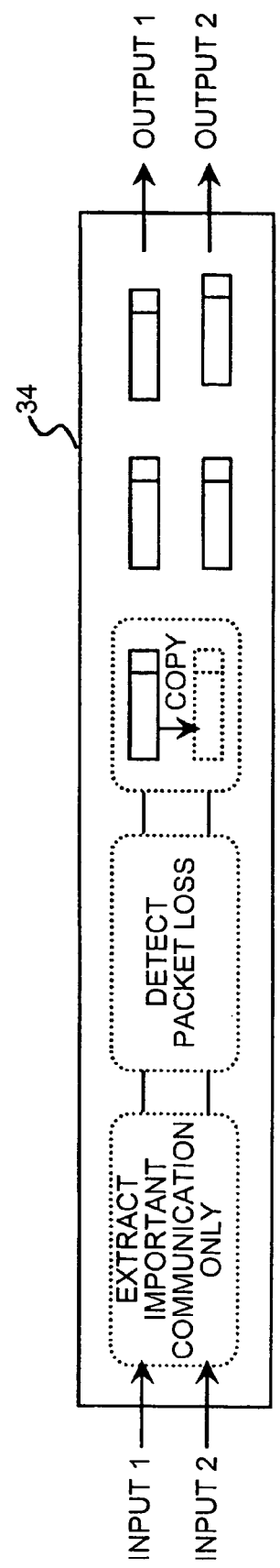
FIG. 10 is an explanatory view of an outline of a processing performed by an important communication processing unit.

As shown in FIG. 10, the important communication processing unit 34 of the internetwork connection unit 30 shown in FIG. 8 extracts and compare important communication packets from a plurality of packets (an input 1 and an input 2) received from the first edge-packet transfer units connected to the respective parallel full-mesh WDM transmission units 1a and 1b. In addition, the important communication processing unit detects whether a packet loss is present for one of the packets. If the packet loss is present, the important communication processing unit 34 copies the other packet and outputs the packets. It is thereby possible to realize a redundant packet communication and enhance reliability for an important communication.

By extracting and processing not all the packets but only the important communication packets, a load of the important communication processing unit can be lessened and a real-time processing can be realized.

Fourth Embodiment

The user network and the external network connected to the full-mesh multistage network according to the present invention normally use different communication methods, respectively. For this reason, a correct communication cannot be established only by simply connecting these networks to the full-mesh multistage network.

Considering these, according to the present invention, the communication methods used by the user network and the external network are separated from a communication method used within the full-mesh multistage network (used by the full-mesh WDM transmission unit). A packet form for each of the communication methods used by the user network and the external network is processed into a packet form for the communication method used by the full-mesh WDM transmission unit so as to establish a communication within the full-mesh multistage network. It is thereby possible to connect the user network and the external network different in communication method to the full-mesh multistage network.

Specifically, the packet recognizing unit 21 of the edge-packet transfer unit 2 shown in FIGS. 3 and 4 (or of the internetwork-connection and edge-packet transfer unit 20 or 200 shown in FIG. 5 or 9) identifies the destination edge-packet transfer unit and a service from the header of the packet. If the communication method corresponding to the service identified by the packet recognizing unit differs from that used by the full-mesh WDM transmission unit, the packet processing unit 24 processes the packet form of the packet received by the external-packet transmitting/receiving unit from the outside into the packet form for the communication method used by the full-mesh WDM transmission unit. If the communication method corresponding to the service identified by the packet recognizing unit differs from that for the full-mesh WDM network, the packet processing unit 24 processes the packet form of the packet input from the full-mesh WDM transmission unit to the internal-packet transmitting/receiving unit and output to the external-packet transmitting/receiving unit into the packet form for the communication method corresponding to the service.

Namely, the packet recognizing unit 21 identifies the service corresponding to the packet received (from the user terminal on the user network through the access network or the like). In addition, the packet processing unit 24 processes the packet form of the packet into the packet form for the communication method used by the full-mesh WDM transmission unit and corresponding to the service, and the processed packet is then transmitted.

The edge-packet transfer unit 2, 2-1 or 2-2 (or internetwork-connection and edge-packet transfer unit 20 or 200) present on a communication path repeatedly performs this processing if it is necessary to do so (it is noted that if edge-packet transfer unit that serves as the input to the full-mesh multistage network processes the packet form of the packet into the packet form for the communication method used within the full-mesh multistage network, the edge-packet transfer unit on the communication path does not necessarily processes the packet). In the edge-packet transfer unit as an endpoint of the communication path, the packet recognizing unit 21 identifies the corresponding service, and the packet processing unit 24 processes the packet back into the packet form for the user network or the external network corresponding to the service. It is thereby possible to establish a packet communication in which a plurality of services are superimposed and make effective use of the network.

Examples of the type of the service include a real-time communication such as a VoIP communication or a videophone communication, a private communication within a full-mesh multistage network, an external network connection communication by an ISP connection or the like, and an inter-specific external network communication such as VPN or the like.

Fifth Embodiment

In the real-time communication such as the VoIP communication or the videophone communication, the external network connection communication such as the ISP connection, and the inter-specific external network communication such as the VPN, it is necessary to interconnect the network to the external network or the like.

To this end, as shown in FIG. 1, the packet communication network includes the gateway unit 7 that interconnects a specific edge-packet transfer unit 2 to the external network 8. In the specific edge-packet transfer unit 2, if the service identified by the packet recognizing unit 21 is the service for connecting the specific edge-packet transfer unit to the external network 8, the packet processing unit 24 processes the packet output to the external-packet transmitting/receiving unit into the packet form for the communication method corresponding to the service. In addition, the external-packet transmitting/receiving unit transmits the processed packet to the gateway unit 7 corresponding to the external network 8 that is identified as the destination of the packet by the packet recognizing unit 21. It is thereby possible to hold a packet communication of the specific edge-packet transfer unit 2 with the external network 8.

Furthermore, the gateway unit 7 includes a function of adding an identifier to a packet. This function enables the packet recognizing unit 21 to identify packets from the different external networks 8 to the same edge-packet transfer unit, i.e., the packets from the different gateway units even if the service is the same.

As already explained, the communication method used within the full-mesh multistage network is separated from the communication method used by each of the user network and the external network. It is, therefore, possible to ensure high security for the communication between the full-mesh multistage network and each of the user network and the external network.

If the gateway unit 7 further includes a function of shielding an illegal packet or an attack packet from or to the external network 8, it is possible to ensure higher security.

Sixth Embodiment

Figure 11:
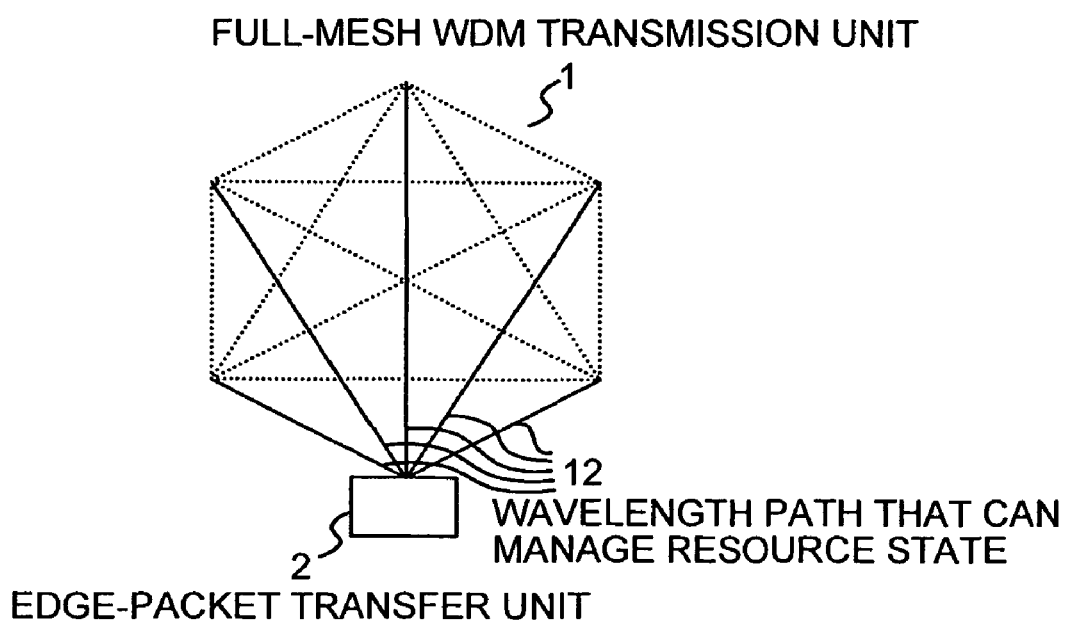
FIG. 11 is an explanatory view of wavelength paths managed by a resource management unit.
Figure 12:
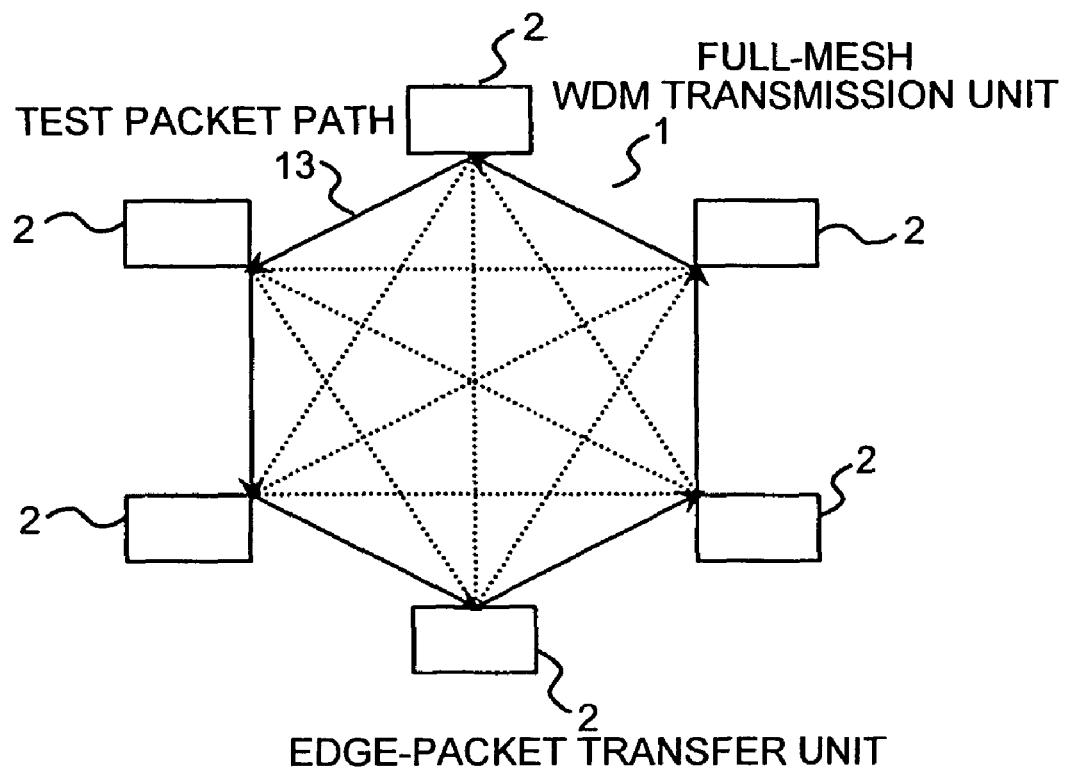
FIG. 12 is an explanatory view of a manner of managing a resource state by a test packet.

As shown in FIG. 11, the resource management unit 25 of the edge-packet transfer unit 2 shown in FIGS. 3 and 4 (or the internetwork-connection and edge-packet transfer unit 20 or 200 shown in FIG. 5 or 9) manages resource states of all the wavelength paths 12 related to the interfaces to which the edge-packet transfer unit of the full-mesh WDM transmission unit 1 is connected. Examples of the managed resource state include a band utilization rate for each packet priority of each wavelength path and a band utilization rate for each service. The band utilization rate for each packet priority of each wavelength path can be grasped by causing the resource management unit 25 to measure bands used by the internal-packet transmitting/receiving unit for packet transmission and packet reception for each priority per unit time of each wavelength path.

Furthermore, the Resource-information transfer unit 26 of the edge-packet transfer unit 2 shown in FIGS. 3 and 4 (or the internetwork-connection and edge-packet transfer unit 20 or 200 shown in FIG. 5 or 9) transfers resource state information on each of the resource state as a packet. The resource-information transfer unit 26 transfers the resource state information in response to an operation system or any one of various servers. The operation system or the server can thereby grasp the resource state and easily manage a traffic state.

Furthermore, the resource-information transfer unit 26 of each edge-packet transfer unit 2 adds local resource state information to the test packet and sequentially transmits the test packet. Each edge-packet transfer unit 2 can thereby manage the resource state information on the other edge-packet transfer units 2, and a communication restriction, a detour or the like during traffic congestion can be realized based on this managed information. Specific examples of the test packet will now be explained.

In all the edge-packet transfer units 2 connected to a certain full-mesh WDM transmission unit 1, one of the resource-information transfer units 26 adds local resource state information to a received test packet (or overwrites the information on the previously added information if any). In addition, the resource-information transfer unit 26 transfers the resultant test packet to the next edge-packet transfer unit 2 in an order in which the test packet makes a round of all the edge-packet transfer units 2. By always repeating this operation, the resource state information on all the edge-packet transfer units 2 is always recorded in the test packet while temporal irregularities among the respective pieces of information are suppressed within a predetermined time interval (that is a time within which the test packet makes a round of all the edge-packet transfer units 2). The resource management unit 25 of each edge-packet transfer unit 25 records this information, whereby all pieces of resource state information within the full-mesh WDM transmission unit 1 can be managed.

Figure 13:
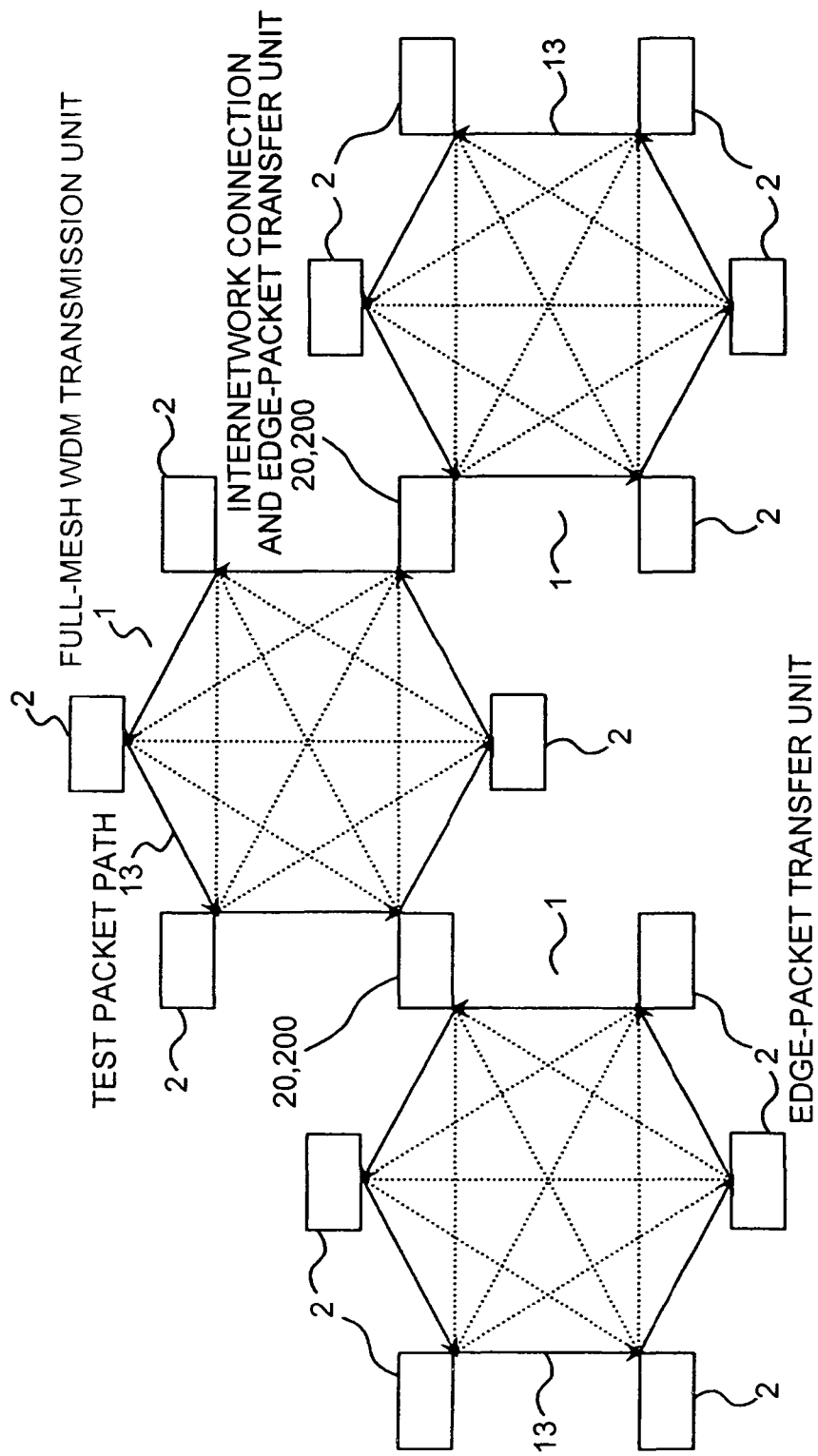
FIG. 13 is an explanatory view of a manner of managing the resource state in an entire full-mesh multistage network.

Furthermore, as shown in FIG. 13, the transfer of the test packet is executed in the entire full-mesh multistage network. In addition, the resource-information transfer unit 26 of each internetwork-connection and edge-packet transfer unit 20 or 200 adds all pieces of resource management information on each of all the test packets received by different full-mesh WDM transmission units 1 to the respective test packets (or overwrites the information on the previously added information if any). By doing so, all pieces of resource states information within the full-mesh multistage network are finally and always recorded in all the respective test packets. The resource management unit 25 of each edge-packet transfer unit (or internetwork-connection and edge-packet transfer unit) records this information, whereby all pieces of resource state information within the full-mesh multistage network can be managed.

In the configuration shown in FIG. 13, the internetwork-connection and edge-packet transfer unit 20 or 200 is employed. However, if the internetwork connection units and the edge-packet transfer units are not functionally integrated together, all the edge-packet transfer units connected to the internetwork connection units cause the test packet to make a round of all the edge-packet transfer units and add all pieces of resource management information on each edge-packet transfer unit to the test packet (or overwrites the information on the previously added information if any). It is thereby possible to realize the same functions as explained above.

All the pieces of resource state information within each of these full-mesh WDM transmission units or within the full-mesh multistage network, which information each edge-packet transfer unit manages, are transferred by each resource-information transfer unit 26 according to the request from the operation system or any one of various servers. The operation system or the server can thereby grasp all the resource states only by holding a communication with one of the edge-packet transfer unit having a direct connection or the like to the operation system or the server.

As explained, all pieces of resource state information within the full-mesh multistage network can be grasped by each edge-packet transfer unit. Thanks to this, if a congestion occurs within a certain full-mesh WDM transmission unit, each edge-packet transfer unit can autonomously perform such a processing as a restriction of a communication with the full-mesh WDM transmission unit. This can improve the reliability of the overall full-mesh multistage network.

Seventh Embodiment

Figure 14:
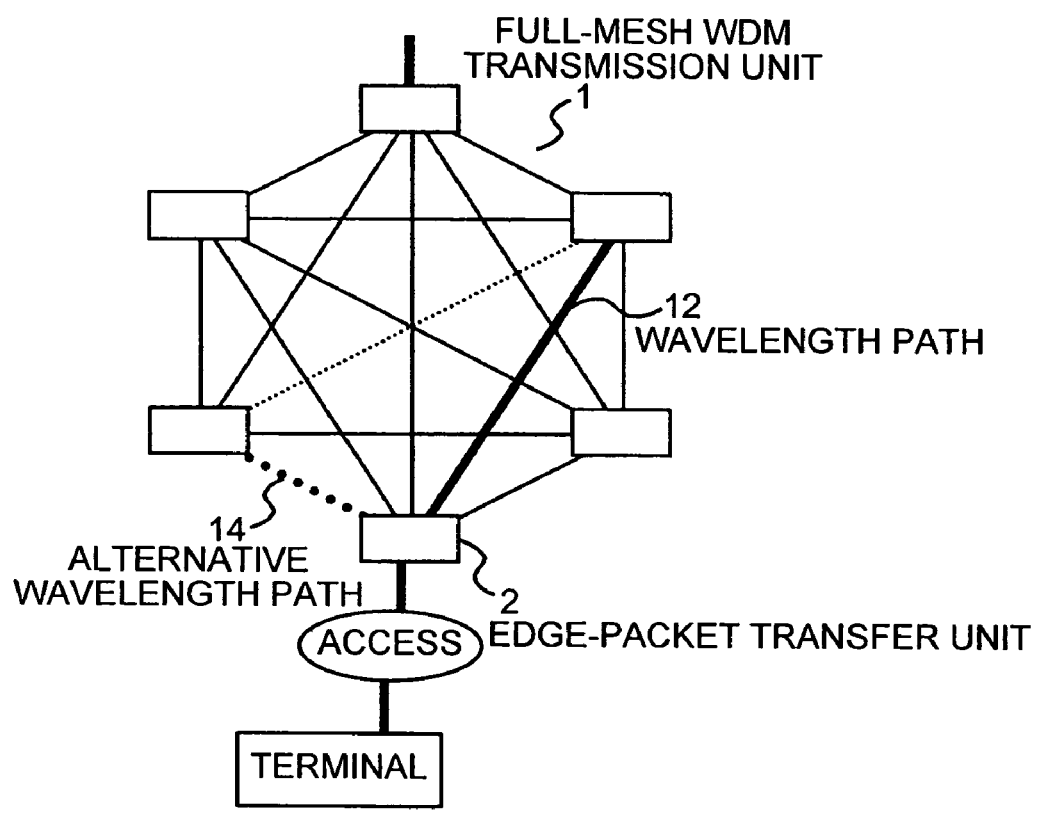
FIG. 14 is an explanatory view of causing a packet to make a detour due to the other wavelength path.

As shown in FIG. 14, the packet is input from the external-packet transmitting/receiving unit (or the lower-stage-packet transmitting/receiving unit or upper-stage-packet transmitting/receiving unit or the full-mesh WDM transmission unit 1. In addition, the destination of the input packet identified by the packet recognizing unit 21 is the other edge-packet transfer unit 2 (or the internetwork-connection and edge-packet transfer unit) connected to the full-mesh WDM transmission unit 1. The internal edge packet transmitting/receiving unit (or the upper-stage-packet transmitting/receiving unit or the lower-stage-packet transmitting/receiving unit) of the edge-packet transfer unit 2 (or internetwork-connection and edge-packet transfer unit) transmits the packet that is to follow an alternative path to the wavelength path 12 of the full-mesh WDM transmission unit 1 corresponding to the other edge-packet transfer unit 2 (or the internetwork-connection and edge-packet transfer unit). In this case, if the resource state of the wavelength path 12 is determined to be equal to or higher than a threshold based on the resource state information on the wavelength path received from the resource management unit 25, the internal edge packet transmitting/receiving unit (or the upper-stage-packet transmitting/receiving unit or lower-stage-packet transmitting/receiving unit) transmits the packet to the other wavelength path (alternative wavelength path) 14.

As an example of the alternative wavelength path and that of identification of the alternative wavelength path, a best effort communication packet is identified according to a priority of each packet. Examples of the resource state of the wavelength path include a band utilization rate of a highest priority packet and a band utilization rate of all the packets.

As one example of selection of the other or alternative wavelength path 14, a wavelength path the resource state of which is the lowest is selected based on the resource state information. If the resource management unit 25 can manage all pieces of resource state information within the full-mesh WDM transmission unit 1 using the test packet, the alternative wavelength path 14 can be selected while considering a resource state of a path after the alternative wavelength path 14 indicated by a thin broken line in FIG. 14.

The edge-packet transfer unit 2 connected to the alternative wavelength path 14 transmits the packet to the wavelength path (that is the wavelength path indicated by the thin broken line in the example of FIG. 14) corresponding to the destination of the packet by an ordinary processing. Therefore, the detour ((the alternative wavelength path 14)+(the wavelength path indicated by the thin broken line) in the example of FIG. 14) within the full-mesh WDM transmission unit 1 can be realized as shown in FIG. 14.

In a network in which a VoIP service and a best effort service are mixed up, the best effort packet less influenced by the delay, jitter or the like due to the detour follows the alternative wavelength path. It is thereby possible to make effective use of an excessive band for the VoIP packet communication for which use of bands is less). In addition, even if the wavelength path is communicably disconnected due to a fault, this detour can be used by detection of an optical signal cutoff by the resource management unit.

Eighth Embodiment

In a P2P packet communication such as the VoIP or videophone communication followed by a call admission control exerted by a control server, if a new communication is to be started between the user terminals, one user terminal, e.g., a user terminal 6-1 transmits a call control packet of a call request (including information on a communication partner) to a control server 9-1 that manages the user terminal 6-1. The control server 9-1 transmits the call request to a control server 9-2 that manages the user terminal of the communication partner, e.g., a user terminal 6-2. The control server 9-2 transmits the call control packet of the call request to the user terminal 6-2 of the communication partner.

The user terminal 6-2 of the communication partner transmits a call control packet of a call response including information as to whether to admit a communication to the control server 9-2 that manages the user terminal 6-2. The control server 9-2 transmits the call response to the control server 9-1 that manages the user terminal 6-1 that is the communication source. The control server 9-1 transmits the call control packet of the call response to the user terminal 6-1 that is the communication source. The user terminal 6-1 of the communication source receives a result of the call response (admission or non-admission of the communication), and starts a call with the communication partner if the call is admitted.

At this time, it is practically necessary for the control server 9-1, which transmits the call request, to manage network resources and to admit or not admit the communication according to the resource state. This processing will be referred to as "call admission control". In the call admission control, however, it is necessary to accurately manage the resources of the network (serving as the path) involved with the communication. In the IP network such as the VoIP network, resource management problem needs to be solved because of presence of a problem of a change in path due to routing.

The external-packet transmitting/receiving unit or internal-packet transmitting/receiving unit of the edge-packet transfer unit 2 (or internetwork-connection and edge-packet transfer unit) adds to the call control packet the resource state information received from the resource management unit 25 if the packet type of the packet identified by the packet recognizing unit 21 is the call control packet.

Figure 16:
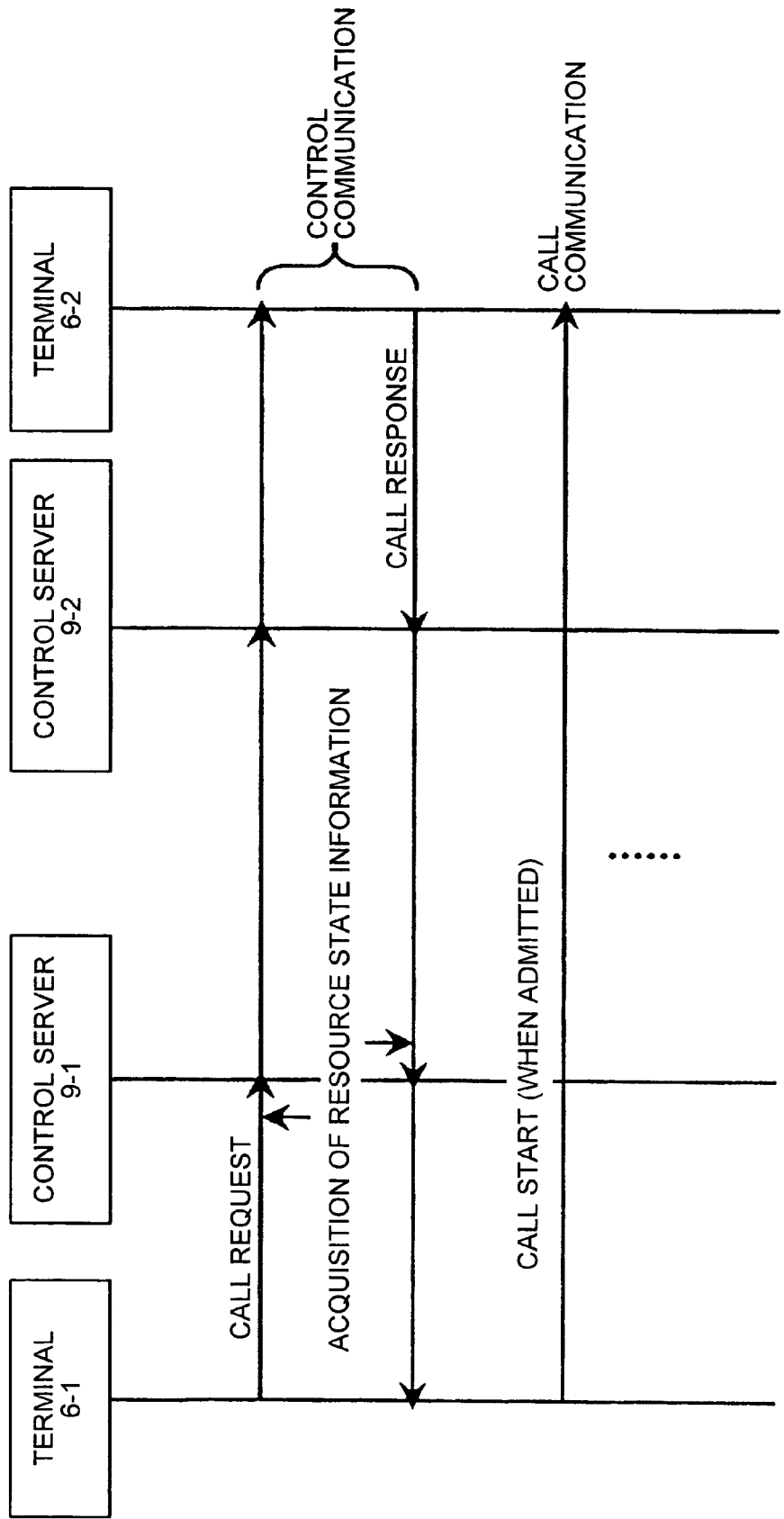
FIG. 16 is a control sequence diagram corresponding to FIG. 15.

This processing is repeatedly performed by each edge-packet transfer unit on the path of the control communication. As shown in FIG. 16, a call admission control unit (not shown) of the control server 9-1 acquires the resource state information from the call control packets of the call request and the call response. In addition, the call admission control unit determines whether to admit the P2P packet communication according to the acquired resource state information, and transmits a determination result (admission or non-admission) to the user of the communication source while including the determination result in a call response.

Figure 15:
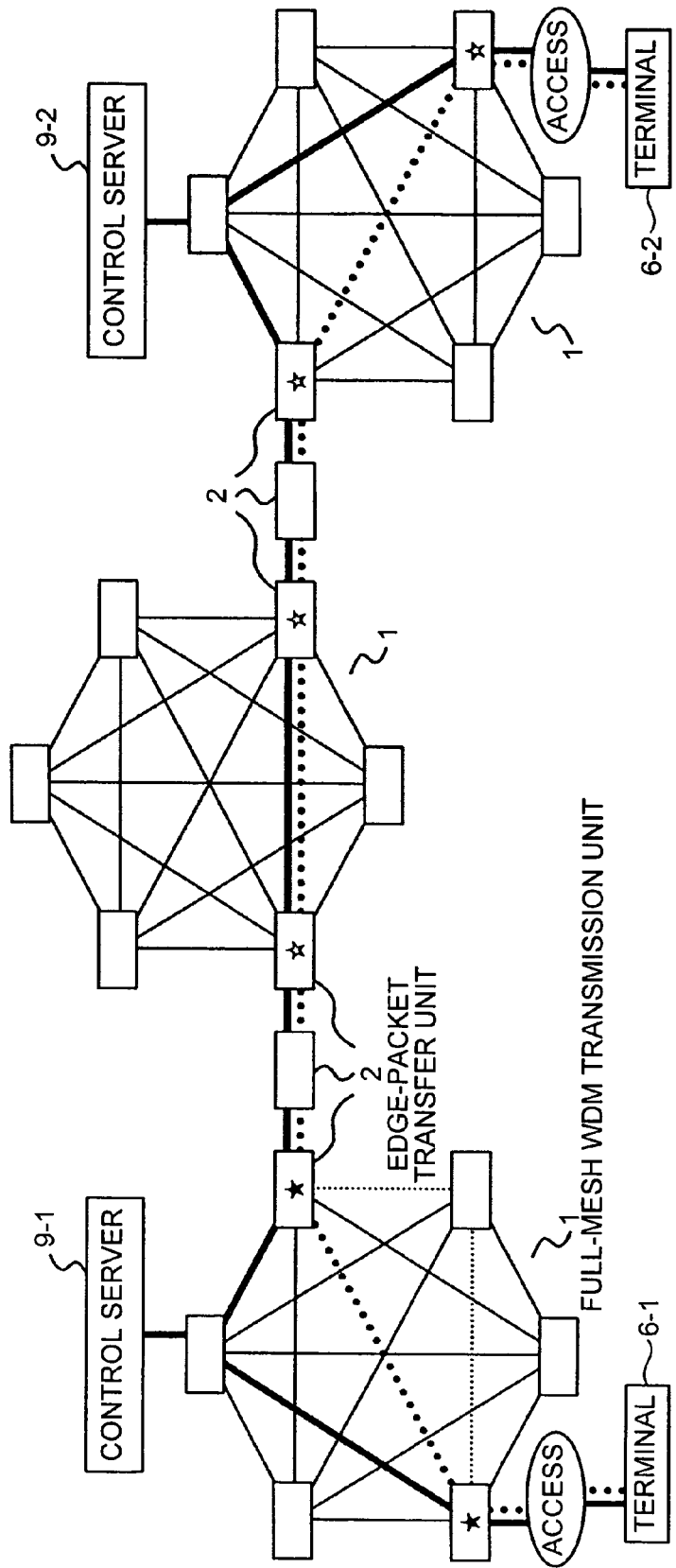
FIG. 15 is a block diagram of a state of a call admission control communication by a control server.

In the full-mesh multistage network shown in FIG. 15, a call control packet that passes through a path indicated by a thick line passes through all the edge-packet transfer units (indicated by stars) on a path (indicated by a thick broken line) for the communication packet. The control server 9-1 can, therefore, acquire the resource state information on the wavelength path used in the communication from the call control packets.

As for the alternative path (indicated by a thin broken line) of the full-mesh WDM transmission unit 1, the edge-packet transfer units (indicated by black stars) on both ends of the alternative path manage the resource state information on the wavelength path used as the path. Therefore, if the ordinary path is not admitted due to insufficient resources according to the method, the call admission control unit of the control server 9-1 can transmit the alternative path for which resources can be secured and the communication can be admitted to the user of the communication source while including the alternative path in the call response.

Through these processings, it is possible to grasp the resource state of the communication path in the P2P packet communication such as the VoIP communication or the videophone communication followed by the call admission control exerted by the control server. In addition, the call admission control by the control server can be realized.

Furthermore, if the ordinary communication path is congested due to the insufficient resources, the user can be informed of the alternative path of the full-mesh WDM unit for which path resources are sufficient and which path is not congested. It is thereby possible to realize the detour communication during the congestion. Besides, a new communication sequence other than that of the ordinary call admission control communication does not occur in the call admission control communication. The call admission control can be, therefore, realized with hardly increasing a time for setting a communication start.

EXAMPLES

First Example

Figure 17:
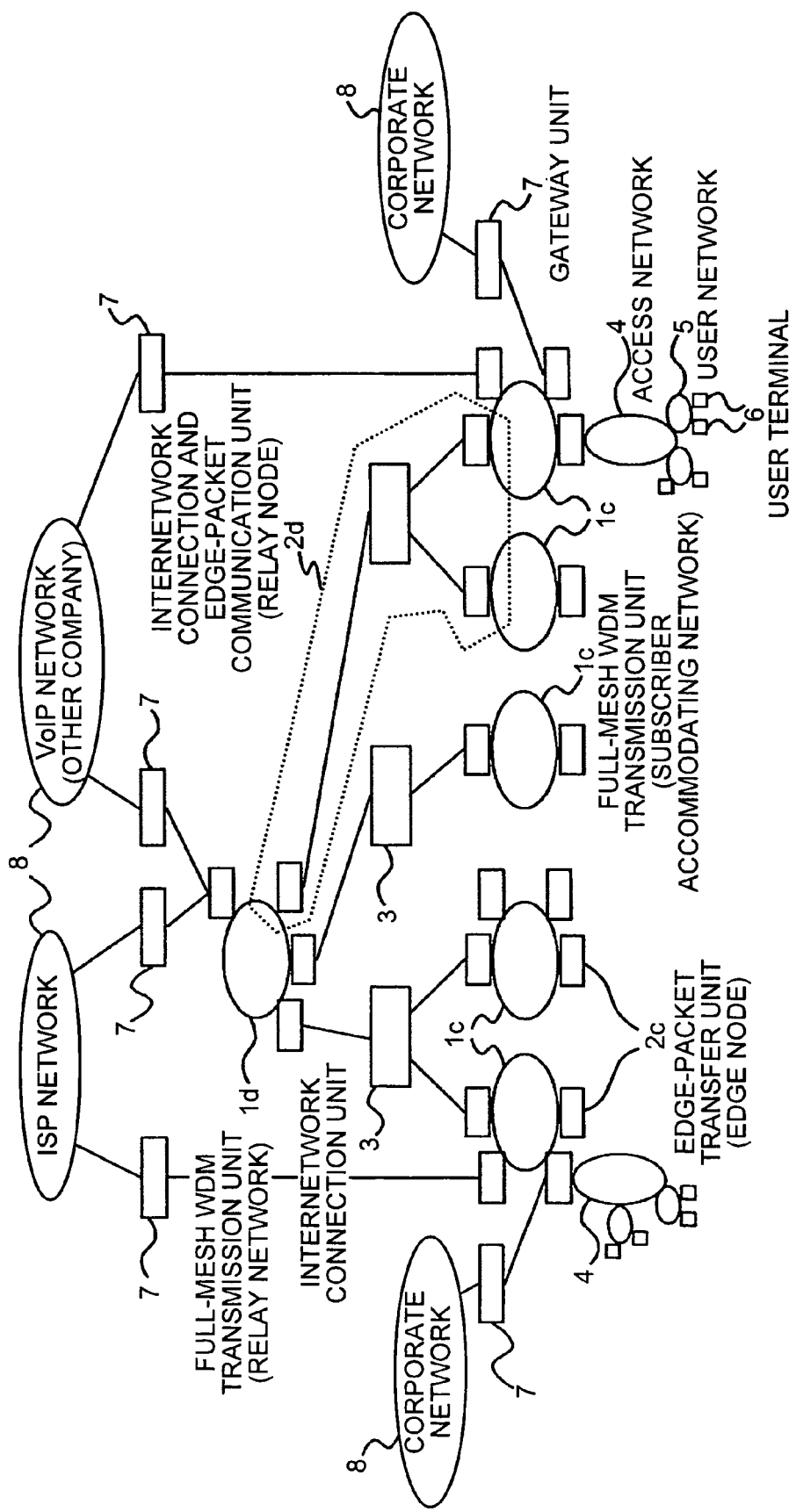
FIG. 17 is a block diagram of a packet communication network according to one example of the present invention.
Figure 18:
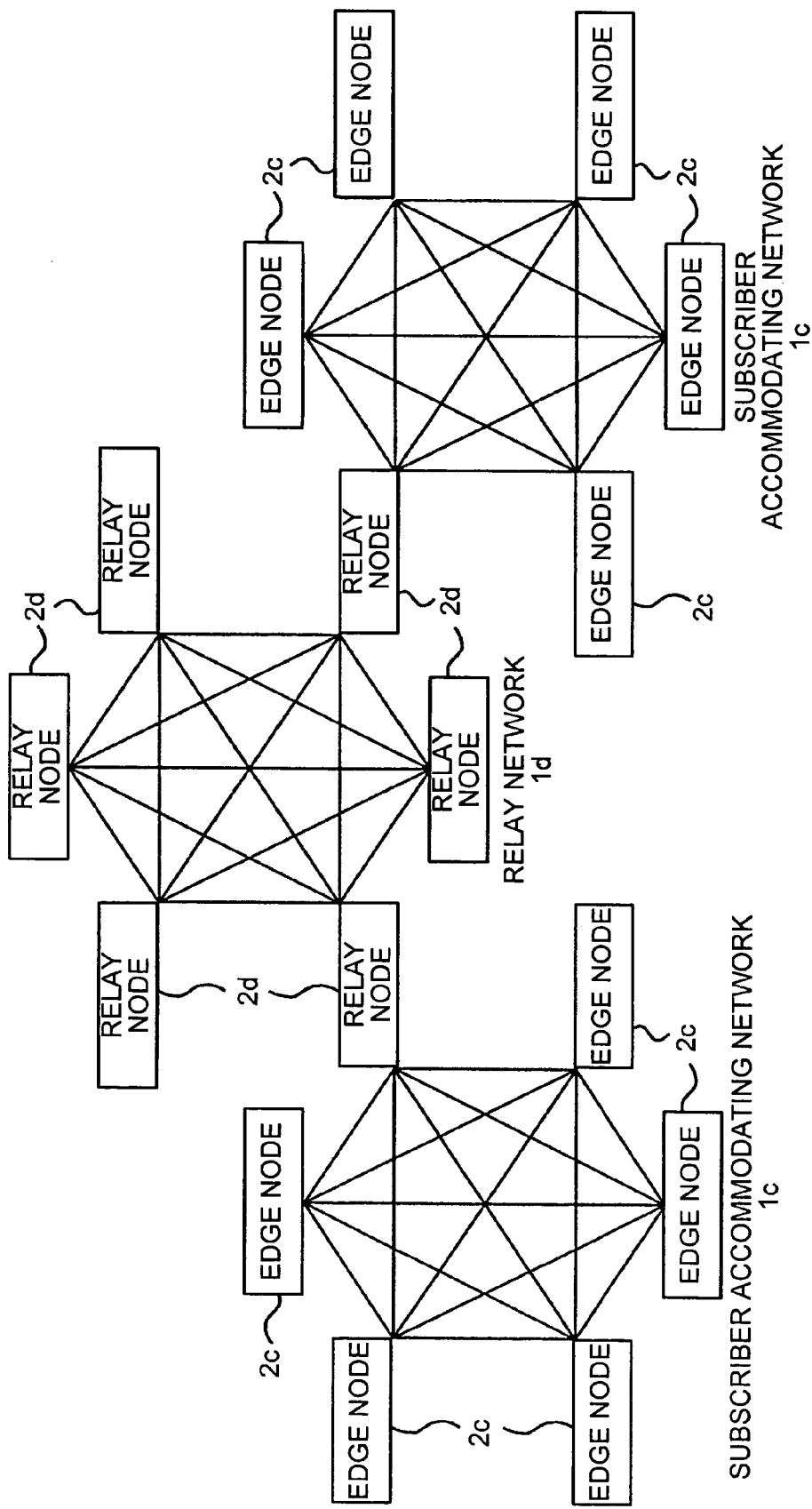
FIG. 18 is a block diagram of basic elements of the network shown in FIG. 17.

FIG. 17 is an example of a full-mesh multistage (two-stage) network configured so that each subscriber accommodating network is a lower-stage full-mesh WDM transmission unit and so that a relay network is an upper-stage full-mesh WDM transmission units. FIG. 18 depicts basic elements of the full-mesh multistage network shown in FIG. 17.

If each of subscriber accommodating networks 1*c* and a relay network 1*d* is constituted by a start network based on optical crossconnect using the WDM technique, each of the subscriber accommodating networks 1*c* and the relay network 1*d* can include about 100 interfaces. This is because a limit number of wavelengths according to the WDM is currently about 128. In case of Japan, the full-mesh multistage network that includes one subscriber accommodating network 1*c* per urban or prefecture can be constructed by two stages. The subscriber accommodating network 1*c* per prefecture can accommodate about 100 edge nodes 2*c*. Thus, the network that ensures an across-the-nation scalability can be constructed.

In actual operations, an instance in which a transmission path consisting of an optical fiber is provided directly between the interfaces having heavy traffic so as to replace the wavelength path having a limited bandwidth (transmission amount) can be considered. Alternatively, even if an optical transmission unit that enables a full-mesh communication using a mixture of the wavelength path and the optical fiber path is formed, the idea of the present invention can be used.

An instance of constructing the full-mesh multistage (two-stage) network using the IP or MPLS method as the communication method used within the network will be explained.

In the IP packet communication, dynamic routing is frequently used. In the network according to this example, IP addresses corresponding to a tree structure of the full-mesh WDM transmission unit are systematically allocated, so that a routing table is simplified. It is thereby possible to use static routing.

Specifically, IP addresses are allocated to the respective subscriber accommodating networks 1*c* and the respective edge nodes 2*c* (users or the like belonging to the respective edge nodes). By doing so, an IP routing table of the edge nodes 2c can be quite simplified as shown in FIG. 19, thereby facilitating the operation management, the fault segmentation, and the like.

Second Example

As the important communication, the VoIP-based 110/119 dialing or the like is known. Therefore, extraction of the important communication by the important communication processing unit in the IP communication can be identified according to a priority of DSCP (DiffServ Code Point) of an IP header. Furthermore, a VoIP-based telephone conversation or communication is normally held according to RTP (Real-time Transport Protocol). Since an RTP header includes a sequence number, the packet loss can be easily confirmed.

Third Example

Specific methods for causing the packet recognizing unit to identify the corresponding service are as follows. The packet recognizing unit can identify the corresponding service according to the priority of the DSCP of the IP header in the real-time communication such as the VoIP communication or the videophone communication, and according to the difference in communication protocol (e.g., PPPoE), a transmission source IP address (different from an IP address for the internal communication) or the like in the external network connection communication such as the ISP connection communication. In addition, the packet recognizing unit can identify the corresponding service according to a VLAN ID, a physical port of each subscriber accommodating or relay node or the like allocated by the gateway unit in the inter-specific external network communication.

Specific methods of causing the packet processing unit to process the packet into the packet form for the communication method used within the full-mesh multistage network to correspond to the service are as follows (except for the real-time communication such as the VoIP or videophone communication). For the external network connection communication such as the ISP connection communication, the packet processing unit processes the packet into the packet form according to IP tunneling (L2TPv2 (Layer2 Tunneling Protocol Version 2), IPsec (tunnel mode), IPinIP or the like). For the inter-specific external network communication such as the VPN communication, the packet processing unit processes the packet into the packet form according to L2-VPN (L2TPv3 (Layer2 Tunneling Protocol Version3) or the like), L3-VPN (IPsec (tunnel mode), IPinIP or the like) or the like.

If the communication method within the full-mesh multistage network is the MPLS method, the packet processing unit processes the packet into the packet form according to L2-VPN (EoMPLS (Ethernet® over MPLS) or the like), L3-VPN (BGP/MPLS-VPN or the like) or the like for the inter-specific external network communication such as the VPN communication.

If the VoIP network of one company connected to the VoIP network of the other company according to the VoIP by inter-connect or the like differs from the VoIP network of the other company in priority-related policy, the packet processing unit processes a packet different in policy so that the DSCP of the IP header is according to the policy of the other company.

By processing the packet into the packet form for each of these communication methods, it is possible to realize packet communication for various services such as the real-time communication, the external network connection communication, or the inter-specific external network communication while superimposing together the packet communications in one full-mesh multistage network.

Fourth Example

Figure 20:
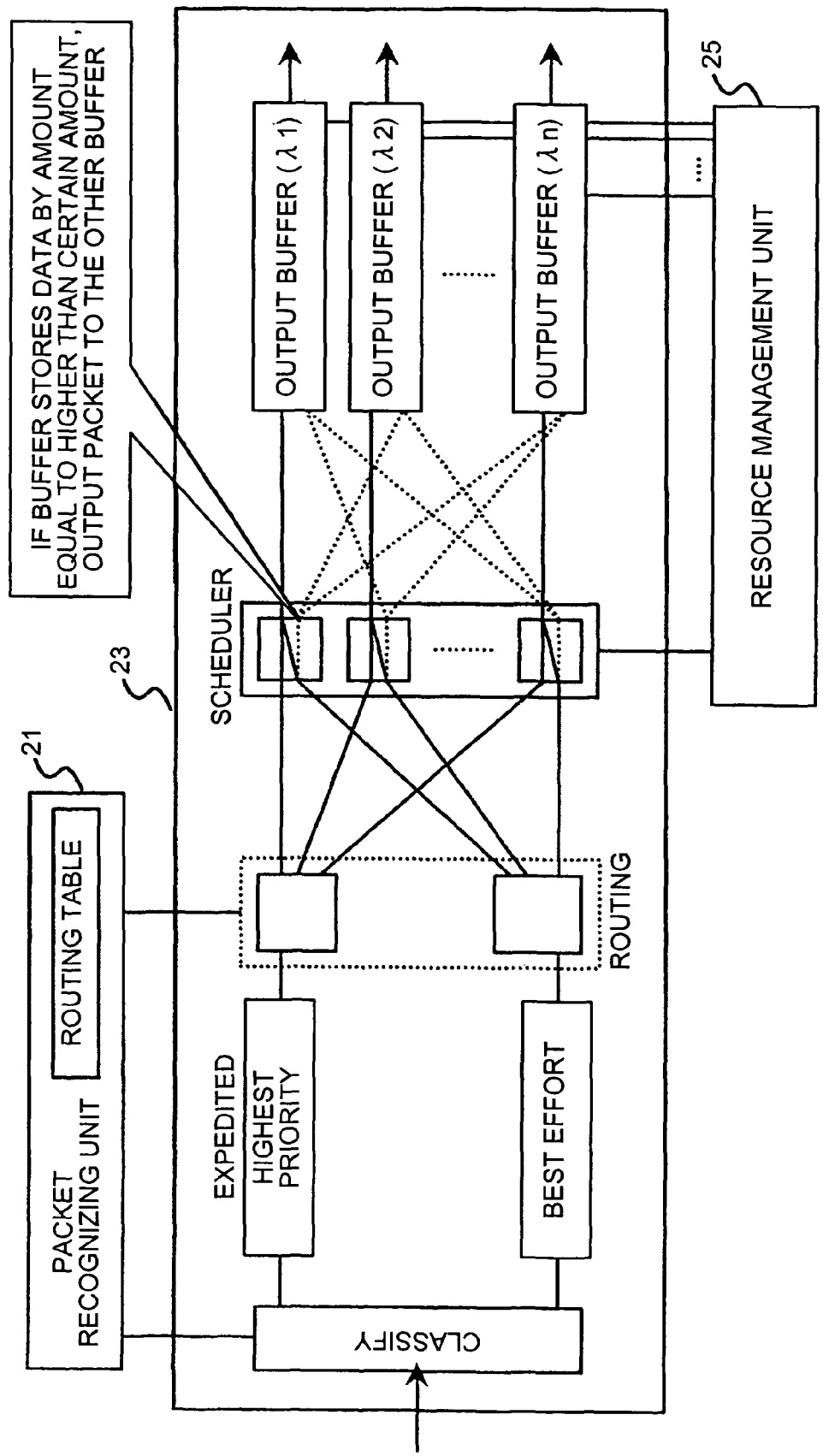
FIG. 20 is an explanatory view of one example of a detour processing performed by a packet transmitting/receiving unit in the edge-packet transfer unit.

In the IP communication in which the VoIP communication and the best effort communication are mixed up, the internal-packet transmitting/receiving unit 23 classifies packets according to the priority of the DSCP of each IP header while putting a highest priority to VoIP packets as shown in FIG. 20. In addition, for best effort packets, if a transmission output buffer stores packets in amount equal to or higher than a certain amount (resources of the corresponding wavelength path is equal to or higher than a threshold), a scheduler automatically transmits the packets to the other buffer having a sufficient capacity.

A processing performed by this scheduler is a processing performed irrespectively of the IP routing (after the IP routing in FIG. 20). Due to this, a detour can be realized without any change or the like in the IP routing table.

It is thereby possible to realize the detour without the following problems. A time lag is generated before the table change is completed in all the relevant routers in the static routing or dynamic routing. During the time lag, there is a probability that the routing cannot be correctly performed.

Fifth Example

If a SIP protocol is used for the P2P packet communication for holding the call admission control communication by the control server, then the control server corresponds to a SIP proxy server, the telephone conversation request corresponds to "INVITE" message, and the telephone conversation response corresponds to "200ok" message, "486 Busy Here" message or the like.

If the alternative path for which resources can be secured and the conversation can be admitted is transmitted to the user terminal of the communication source while including the alternative path in the call response as explained in BEST MODE(S) FOR CARRYING OUT THE INVENTION, the detour communication can be realized using IP source routing (which can be realized using the IP routing header according to IPv6) without changing the routing table. In the IP source routing, the user terminal explicitly designates an IP address of each edge-packet transfer unit on the alternative path.

INDUSTRIAL APPLICABILITY

The present invention can be useful as communication infrastructure such as VoIP communication or Internet connection communication infrastructure required of scalability and reliability.

The invention claimed is:
1. A packet communication system comprising:
at least two full-mesh wavelength-division-multiplexing transmission units, each of which includes n number of interfaces, the full-mesh wavelength-division-multiplexing transmission units capable of establishing a bidirectional full-mesh communication between all of the interfaces using a wavelength path based on a wavelength-division-multiplexing technique, where n is an integer equal to or greater than 3;
a plurality of edge-packet transfer units, each of which includes at least a packet recognizing unit, an external-packet transmitting/receiving unit, and an internal-packet transmitting/receiving unit, and is connected to the interface of one of the full-mesh wavelength-division-multiplexing transmission units by the internal-packet transmitting/receiving unit; and an internetwork connection unit that includes at least a packet recognizing unit and a packet transmitting/receiving unit, and connects the full-mesh wavelength-division-multiplexing transmission units in a multistage tree-shaped structure through the plurality of edge-packet transfer units, the internetwork connection unit being connected between two of the plurality of edge-packet transfer units, wherein one of the two of the plurality of edge-packet transfer units is connected at an upper-stage of the internetwork connection unit, and the other one of the two of the plurality of edge-packet transfer units is connected at a lower-stage of the internetwork connection unit, both the packet recognizing units of the plurality of edge-packet transfer units and the packet recognizing unit of the internetwork connection unit identify a next-destination edge-packet transfer unit that is a next destination of a received packet from a header of the received packet, an external-packet transmitting/receiving unit of a first specific edge-packet transfer unit from the plurality of edge-packet transfer units inputs a first packet received from a user terminal outside of the external-packet transmitting/receiving unit of the first specific edge-packet transfer unit to an internal-packet transmitting/receiving unit of the first specific edge-packet transfer unit, and transmits a second packet output from the internal-packet transmitting/receiving unit of the first specific edge-packet transfer unit to the outside of the external-packet transmitting/receiving unit of the first specific edge-packet transfer unit when the next destination of the second packet identified by a packet recognizing unit of the first specific edge-packet transfer unit is an edge-packet transfer unit that is not connected to one of the full-mesh wavelength-division-multiplexing transmission units, the internal-packet transmitting/receiving unit of the first specific edge-packet transfer unit outputs the second packet input from one of the full-mesh wavelength-division-multiplexing transmission units to the external-packet transmitting/receiving unit of the first specific edge-packet transfer unit when the next destination of the second packet identified by the packet recognizing unit of the first specific edge-packet transfer unit is the edge-packet transfer unit of its own or the edge-packet transfer unit that is not connected to the one of the full-mesh wavelength-division-multiplexing transmission units, transmits the second packet to the external-packet transmitting/receiving unit, and transmits the first packet input from the external-packet transmitting/receiving unit of the first specific edge-packet transfer unit to the wavelength path, which corresponds to the next destination edge-packet transfer unit, of one of the full-mesh wavelength-division-multiplexing transmission units, if the next destination of the first packet identified by the packet recognizing unit of the first specific edge-packet transfer unit is another edge-packet transfer unit connected to the one of the full-mesh wavelength-division-multiplexing transmission units, and the packet transmitting/receiving unit of the internetwork connection unit transmits each packet received from the first specific edge-packet transfer unit to the next destination edge-packet transfer unit that is the next destination of each received packet identified by the packet recognizing unit of the internetwork connection unit.

2. The packet communication system according to claim 1, wherein each of the full-mesh wavelength-division-multiplexing transmission units includes physically-independent plural full-mesh wavelength-division-multiplexing transmission units arranged in parallel, the plurality of edge-packet units includes
  a first type of edge-packet transfer unit connected to one of the full-mesh wavelength-division-multiplexing transmission units and the internetwork connection unit, and
  a second type of edge-packet transfer unit connected to all of the full-mesh wavelength-division-multiplexing transmission units, the internetwork connection unit includes a switching unit that is provided on an input side of the packet transmitting/receiving unit and switches over destinations of a plurality of packets received from a plurality of first type of edge-packet transfer units connected to one of the full-mesh wavelength-division-multiplexing transmission units to determine a plurality of other first type of edge-packet transfer units connected to the other full-mesh wavelength-division-multiplexing transmission units that are the destinations of the plurality of packets received from the plurality of first type of edge-packet transfer units connected to the one of the full-mesh wavelength-division-multiplexing transmission units, and the internal-packet transmitting/receiving unit of the second type of edge-packet transfer unit transmits the first packet input from the external-packet transmitting/receiving unit simultaneously to same-wavelength paths of the full-mesh wavelength-division-multiplexing transmission units corresponding to the first type of edge-packet transfer unit or the second type of edge-packet transfer unit that is the next destination of the first packet identified by a packet recognizing unit of the second type of edge-packet transfer unit, if the next destination of the first packet identified by the packet recognizing unit of the second type of edge-packet transfer unit is another first type of edge-packet transfer unit or another second type of edge-packet transfer unit connected to the full-mesh wavelength division multiplexing units, transmits a plurality of packets input from the same-wavelength paths of the full-mesh wavelength-division-multiplexing transmission units simultaneously to the same-wavelength paths of the full-mesh wavelength division multiplexing units corresponding to the other first type of edge-packet transfer unit or the other second type of edge-packet transfer unit, and if the next destination of the packet identified by the packet recognizing unit of the second type of edge-packet transfer unit is the second type of edge-packet transfer unit itself or the first type of edge-packet transfer unit or second type of edge-packet transfer unit that is not connected to the full-mesh wavelength division multiplexing units, selects one of the packets, and transmits the selected packet to the external-packet transmitting/receiving unit.

3. The packet communication system according to claim 2, wherein the internetwork connection unit includes an important communication processing unit that extracts and compares important communication packets received from the first type of edge-packet transfer units connected to the wavelength division multiplexing transmission units, respectively, and if there is a packet loss in one packet, copies another packet corresponding to the one packet.

4. The packet communication system according to claim 1, wherein
the packet recognizing unit of the first specific edge-packet transfer unit identifies the edge-packet transfer unit that is the next destination of the first packet and a service from a header of the first packet, and
each of the plurality of edge-packet transfer units includes a packet processing unit,
a packet processing unit of the first specific edge-packet transfer unit processes the first packet received from the external-packet transmitting/receiving unit of the first specific edge-packet transfer unit into a packet form for a communication method used by one of the full-mesh wavelength-division-multiplexing transmission units to which the first specific edge-packet transfer unit is connected if a communication method corresponding to the service identified by the packet recognizing unit of the first specific edge-packet transfer unit differs from the communication method used by the full-mesh wavelength-division-multiplexing transmission unit to which the first specific edge-packet transfer unit is connected, and processes the second packet input from the full-mesh wavelength-division-multiplexing transmission unit to which the first specific edge-packet transfer unit is connected to the internal-packet transmitting/receiving unit of the first specific edge-packet transfer unit and output to the external-packet transmitting/receiving unit of the first specific edge-packet transfer unit into a packet form for a communication method corresponding to the service identified by the packet recognizing unit of the first specific edge-packet transfer unit if the communication method corresponding to the service differs from the communication method used by the full-mesh wavelength division multiplexing unit to which the first specific edge-packet transfer unit is connected.

5. The packet communication system according to claim 4, further comprising:
a gateway unit that connects a second specific edge-packet transfer unit from the plurality of edge-packet transfer units and an external network, wherein
a packet processing unit of the second specific edge-packet transfer unit processes a packet output to an external-packet transmitting/receiving unit of the second specific edge-packet transfer unit into the packet form for a communication method corresponding to a service identified by a packet recognizing unit of the second specific edge-packet transfer unit if the service is a service for connecting the second specific edge-packet transfer unit and the external network, and
the external-packet transmitting/receiving unit of the second specific edge-packet transfer unit transmits the processed packet to the gateway unit corresponding to the external network.

6. The packet communication system according to claim 1, wherein
each of the edge-packet transfer units from the plurality of edge-packet transfer units includes
a resource management unit that manages resource states of all of the wavelength paths relating to an interface to which the edge-packet transfer unit of each of the full-mesh wavelength-division-multiplexing transmission units is connected, and
a resource-information transfer unit that transfers information on the resource states as a packet.

7. The packet communication system according to claim 6, wherein
when transmitting the first packet input from the external-packet transmitting/receiving unit of the first specific edge-packet transfer unit or one of the full-mesh wavelength division multiplexing units, the next destination of which identified by the packet recognizing unit of the first specific edge-packet transfer unit is the other edge-packet transfer unit connected to the other of the full-mesh wavelength-division-multiplexing transmission units, to the wavelength path of the full-mesh wavelength-division-multiplexing transmission unit corresponding to the other edge-packet transfer unit, the internal-packet transmitting/receiving unit of the first specific edge-packet transfer unit transmits the first packet to another wavelength path if a resource state of the wavelength path is determined to be equal to or higher than a threshold based on resource state information on the wavelength path managed by a resource management unit of the first specific edge-packet transfer unit.

8. The packet communication system according to claim 6, wherein
in a communication for exercising a call admission control by transmitting a call control packet of a call request or a call response to a control server that includes a call-admission control unit, the external-packet transmitting/receiving unit or the internal-packet transmitting/receiving unit of the first specific edge-packet transfer unit adds resource state information managed by a resource management unit of the first specific edge-packet transfer unit to the call control packet when a type of the first or second packet identified by the packet recognizing unit of the first specific edge-packet transfer unit is the call control packet.

9. The packet communication system according to claim 1, wherein the internal packet transmitting/receiving unit of the first specific edge-packet transfer unit further transmits the packet input from the external-packet transmitting/receiving unit of the first specific edge-packet transfer unit to a same wavelength path of the full-mesh wavelength-division-multiplexing transmission unit, corresponding to the edge-packet transfer unit that is the next destination of the packet identified by the packet recognizing unit of the first specific edge-packet transfer unit, the next destination of the packet not being a final destination of the packet, and
an information of the packet identified by the packet recognizing unit of the first specific edge-packet transfer unit including a destination address and a packet type.

10. A packet communication method using
at least two full-mesh wavelength-division-multiplexing transmission units, each of which includes n number of interfaces, and is capable of establishing a bidirectional full-mesh communication between all of the interfaces using a wavelength path based on a wavelength-division-multiplexing technique, where n is an integer equal to or greater than 3;
a plurality of edge-packet transfer units, each of which includes at least a packet recognizing unit, an external-packet transmitting/receiving unit, and an internal-packet transmitting/receiving unit, and is connected to the interface of one of the full-mesh wavelength-division-multiplexing transmission by the internal-packet transmitting/receiving unit; and an internetwork connection unit that is connected to one of the edge-packet transfer units, the internetwork connection unit including at least a packet recognizing unit and a packet transmitting/receiving unit, and connects the full-mesh wavelength-division-multiplexing transmission units in a multistage tree-shaped structure through the plurality of edge-packet transfer units, the internetwork connection unit being connected between two of the plurality of edge-packet transfer units, wherein one of the two of the plurality of edge-packet transfer units is connected at an upper-stage of the internetwork connection unit by the external-packet transmitting/receiving unit thereof, and the other one of the two of the plurality of edge-packet transfer units is connected at a lower-stage of the internetwork connection unit by the external-packet transmitting/receiving unit thereof, the packet communication method comprising:

a first step of transmitting a packet including a packet recognizing unit of a first specific edge-packet transfer unit from the plurality of edge-packet transfer units identifying a next-destination edge-packet transfer unit that is a next destination of the packet from a header of the packet with respect to the packet received by an external-packet transmitting/receiving unit of the first specific edge-packet transfer unit; and an internal-packet transmitting/receiving unit of the first specific edge-packet transfer unit transmitting the packet to the wavelength path, which corresponds to the next destination edge-packet transfer unit, of one of the full-mesh wavelength-division-multiplexing transmission units corresponding to the next destination of the packet, if the next destination of the packet identified by the packet recognizing unit of the first specific edge-packet transfer unit is another edge-packet transfer unit connected to the one of the full-mesh wavelength-division-multiplexing transmission units; and a second step of transmitting the packet including the external-packet transmitting/receiving unit of the first specific edge-packet transfer unit transmitting the packet to the internetwork connection unit, when the next-destination of the packet identified by the packet recognizing unit of the first specific edge-packet transfer unit is the edge-packet transfer unit that is not connected to the one of the full-mesh wavelength-division-multiplexing transmission units;

the packet recognizing unit of the internetwork connection unit identifying the next-destination edge-packet transfer unit that is a next destination of the packet from the header of the packet, and the internetwork connection unit transmitting the packet to the next-destination edge-packet transfer unit corresponding to the next destination of the packet; and repeating the first step of packet transmitting and the second step of packet transmitting until the packet is output from the next-destination edge-packet transfer unit corresponding to a final destination of the packet.

11. The packet communication method according to claim 10, wherein each of the full-mesh wavelength-division-multiplexing transmission units includes physically-independent plural full-mesh wavelength-division-multiplexing transmission units arranged in parallel, the plurality of edge-packet transfer units includes a first type of edge-packet transfer unit connected to one of the full-mesh wavelength-division-multiplexing transmission units and the internetwork connection unit; and a second type of edge-packet transfer unit connected to all of the full-mesh wavelength-division-multiplexing transmission units, the internetwork connection unit includes a switching unit that is provided on an input side of the packet transmitting/receiving unit of the internetwork connection unit and switches over destinations of a plurality of packets received from a plurality of first type of edge-packet transfer units connected to one of the full-mesh wavelength-division-multiplexing transmission units to determine a plurality of other first type of edge-packet transfer units connected to the other full-mesh wavelength-division-multiplexing transmission units that are the destinations of the plurality of packets, and the packet communication method further comprises:

a third step of transmitting the packet including the internal-packet transmitting/receiving unit of the second type of edge-packet transfer unit transmitting the packet input from an external-packet transmitting/receiving unit of the second type of edge-packet transfer unit simultaneously to same wavelength paths of a plurality of parallel full-mesh wavelength-division-multiplexing transmission units;

the internetwork connection unit selecting a packet to be transmitted by changing a communication configuration between the full-mesh wavelength-division-multiplexing transmission units according to the switching unit of the internetwork connection unit switching over paths from the first type of edge-packet transfer units to the other first type of edge transfer units that are the destinations of the packet; and performing a redundant packet communication by the internal-packet transmitting/receiving unit of the second type of edge-packet transfer unit corresponding to the destination of the selected packet received from the full-mesh wavelength-division-multiplexing transmission units and transmitting the selected packet.

12. The packet communication method according to claim 11, wherein the internetwork connection unit includes an important communication processing unit, and the packet communication method further comprises:

the important communication processing unit extracting and comparing important communication packets from the packets received from the first type of edge transfer units connected to the wavelength division multiplexing transmission units, respectively; and performing the redundant packet communication by copying, if there is a packet loss in one packet, another packet corresponding to the one packet.

13. The packet communication method according to claim 10, wherein each edge-packet transfer unit from the plurality of edge-transfer units includes a packet processing unit, and the packet communication method further comprises:

performing a packet communication, in which plural services are overlapped, by a packet processing unit of the first specific edge-packet transfer unit processing the packet received from the external-packet transmitting/receiving unit of the first specific edge-packet transfer unit into a packet form for a communication method used by the full-mesh wavelength-division-multiplexing transmission unit if a communication method corresponding to a service identified by the packet recognizing unit of the first specific edge-packet transfer unit differs from the communication method used by the full-mesh wavelength-division-multiplexing transmission unit, and processing the packet input from the full-mesh wavelength-division-multiplexing transmission unit to the internal-packet transmitting/receiving unit of the first specific edge-packet transfer unit and output to the external-packet transmitting/receiving unit of the first specific edge-packet transfer unit into a packet form for a communication method corresponding to the service identified by the packet recognizing unit of the first edge-packet transfer unit if the communication method corresponding to the service differs from the communication method used by the full-mesh wavelength division multiplexing unit.

14. The packet communication method according to claim 13, wherein
the packet communication method further uses a gateway unit that connects a second specific edge-packet transfer unit from the plurality of edge-packet transfer units and an external network, and
the packet communication method further comprises:
a packet processing unit of the second specific edge-packet transfer unit processing a packet output to an external-packet transmitting/receiving unit of the second specific edge-packet transfer unit into the packet form for the communication method corresponding to a service identified by the packet recognizing unit of the second specific edge-packet transfer unit if the service is a service for connecting the second specific edge-packet transfer unit and the external network; and
the external-packet transmitting/receiving unit of the second specific edge-packet transfer unit transmitting the processed packet to the gateway unit corresponding to the external network.

15. The packet communication method according to claim 10, wherein
each edge-packet transfer unit from the plurality of edge-packet transfer units includes a resource management unit and a resource-information transfer unit, and
the packet communication method further comprises:
a resource management unit of the first specific edge-packet transfer unit managing resource states of all of the wavelength paths related to the interfaces of each of the full-mesh wavelength-division-multiplexing transmission units to which interfaces of each of the edge-packet transfer unit is connected; and
a resource-information transfer unit of the first specific edge-packet transfer unit transferring information on each of the resource states as a packet.

16. The packet communication method according to claim 15, further comprising:
the internal-packet transmitting/receiving unit of the first specific edge-packet transfer unit transmitting, when transmitting the packet input from the external-packet transmitting/receiving unit of the first specific edge-packet transfer unit or the full-mesh wavelength division multiplexing unit, the destination of which identified by the packet recognizing unit of the first specific edge-packet transfer unit is the other edge-packet transfer unit connected to the full-mesh wavelength-division-multiplexing transmission unit, to the wavelength path of the full-mesh wavelength-division-multiplexing transmission unit corresponding to the other edge-packet transfer unit, the packet to another wavelength path if a resource state of the wavelength path is determined to be equal to or higher than a threshold based on resource state information on the wavelength path managed by the resource management unit of the first specific edge-packet transfer unit.

17. The packet communication method according to claim 15, further comprising:
the external-packet transmitting/receiving unit or the internal-packet transmitting/receiving unit of the first specific edge-packet transfer unit adding resource state information managed by the resource management unit of the first specific edge-packet transfer unit to a call control packet when a type of the packet identified by the packet recognizing unit of the first specific edge-packet transfer unit is the call control packet, in a communication for exercising a call admission control by transmitting the call control packet of a call request or a call response to a control server that includes a call-admission control unit.

18. The packet communication method according to claim 10, wherein said step of first transmitting further comprises:
the internal packet transmitting/receiving unit of the first specific edge-packet transfer unit transmits the packet input from the external-packet transmitting/receiving unit of the first specific edge-packet transfer unit to a same wavelength path of the optical network of the full-mesh wavelength-division-multiplexing transmission unit, corresponding to the edge-packet transfer unit that is the next destination of the packet identified by the packet recognizing unit, the next destination of the packet not being a final destination of the packet, and an information of the packet identified by the packet recognizing unit of the first specific edge-packet transfer unit including a destination address and a packet type.

* * * * *